United States Patent
Tanaka et al.

(10) Patent No.: US 11,529,993 B2
(45) Date of Patent: Dec. 20, 2022

(54) MOTOR CONTROLLER AND ELECTRIC POWER STEERING APPARATUS

(71) Applicant: Mitsubishi Electric Corporation, Tokyo (JP)

(72) Inventors: Kenta Tanaka, Tokyo (JP); Isao Kezobo, Tokyo (JP); Akira Furukawa, Tokyo (JP); Seiji Sawada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 353 days.

(21) Appl. No.: 16/649,710

(22) PCT Filed: Nov. 7, 2017

(86) PCT No.: PCT/JP2017/040064
§ 371 (c)(1),
(2) Date: Mar. 23, 2020

(87) PCT Pub. No.: WO2019/092777
PCT Pub. Date: May 16, 2019

(65) Prior Publication Data
US 2020/0255067 A1    Aug. 13, 2020

(51) Int. Cl.
*H02P 21/16*   (2016.01)
*H02P 21/18*   (2016.01)
(Continued)

(52) U.S. Cl.
CPC .......... *B62D 15/0235* (2013.01); *H02P 21/16* (2016.02); *B62D 5/0463* (2013.01); *H02P 21/18* (2016.02)

(58) Field of Classification Search
CPC ... B62D 15/0235; B62D 5/0463; H02P 21/16; H02P 21/18; H02P 21/0021; H02P 6/17; H02P 21/04; H02P 21/22; H02P 6/10
See application file for complete search history.

(56) References Cited

U.S. PATENT DOCUMENTS

| 2008/0167779 A1* | 7/2008 | Suzuki | B62D 5/046 180/443 |
| 2010/0181140 A1* | 7/2010 | Tomita | H02P 21/18 180/446 |
| 2019/0245463 A1* | 8/2019 | Lee | H02P 6/10 |

FOREIGN PATENT DOCUMENTS

| EP | 2 210 795 A1 | 7/2010 |
| JP | 2002-369569 A | 12/2002 |

(Continued)

OTHER PUBLICATIONS

Extended European Search Report dated Aug. 26, 2020 from the European Patent Office in Application No. 17931551.0.

*Primary Examiner* — Bickey Dhakal
(74) *Attorney, Agent, or Firm* — Sughrue Mion, PLLC; Richard C. Turner

(57) ABSTRACT

To provide a motor controller and an electric power steering apparatus which can suppress torque fluctuation resulting from low detection resolution of angle, with simple calculation, even in condition where the rotational speed of motor is low. A motor controller estimates an angle error correlation value correlated with the angle detection error based on the current command value when a change frequency of the angle detection value is lower than a cutoff frequency of feedback control system which controls a rotation state; corrects the current command value or the angle detection value based on the estimation value of angle error correlation value; and changes the estimation value of angle error correlation value so that the absolute value of angle detection error increases with respect to increase in the current command value, and the absolute value of angle detection error decreases with respect to decrease in the current command value.

16 Claims, 13 Drawing Sheets

(51) Int. Cl.
  *B62D 15/02*    (2006.01)
  *B62D 5/04*     (2006.01)

(56) References Cited

FOREIGN PATENT DOCUMENTS

| | | |
|---|---|---|
| JP | 2006-304478 A | 11/2006 |
| JP | 2011-117769 A | 6/2011 |
| TW | 201228214 A | 7/2012 |

\* cited by examiner

FIG. 7 WITHOUT CORRECTION (COMPARATIVE EXAMPLE)
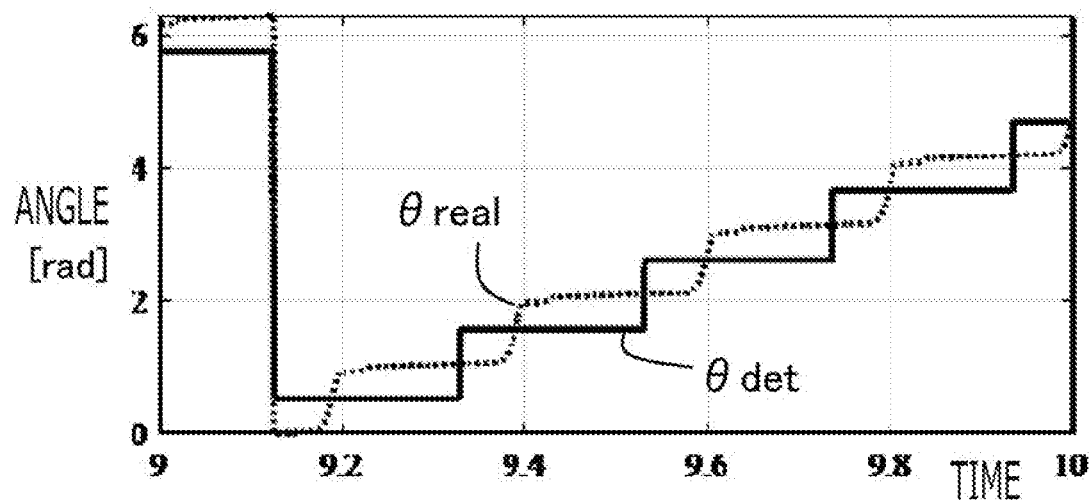
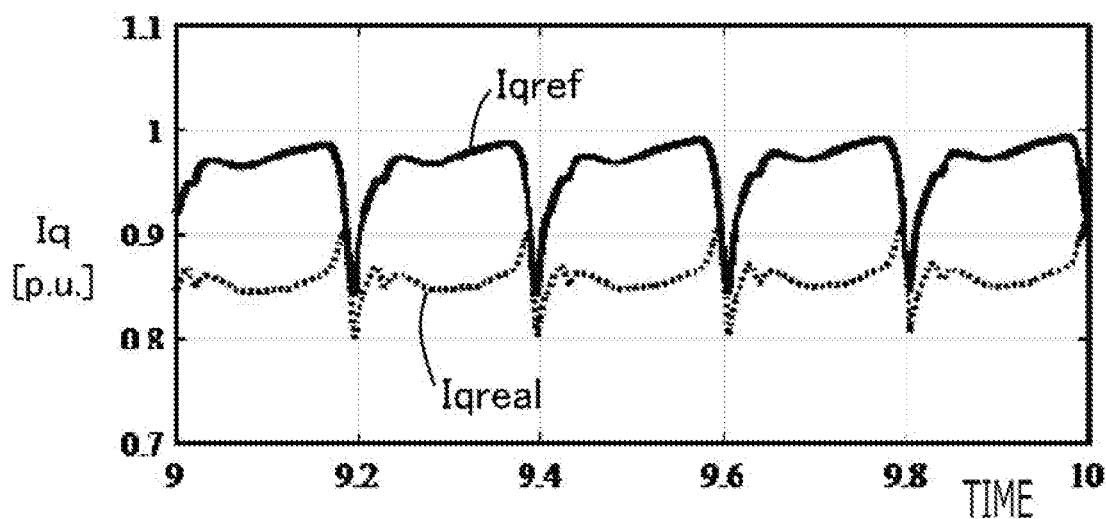
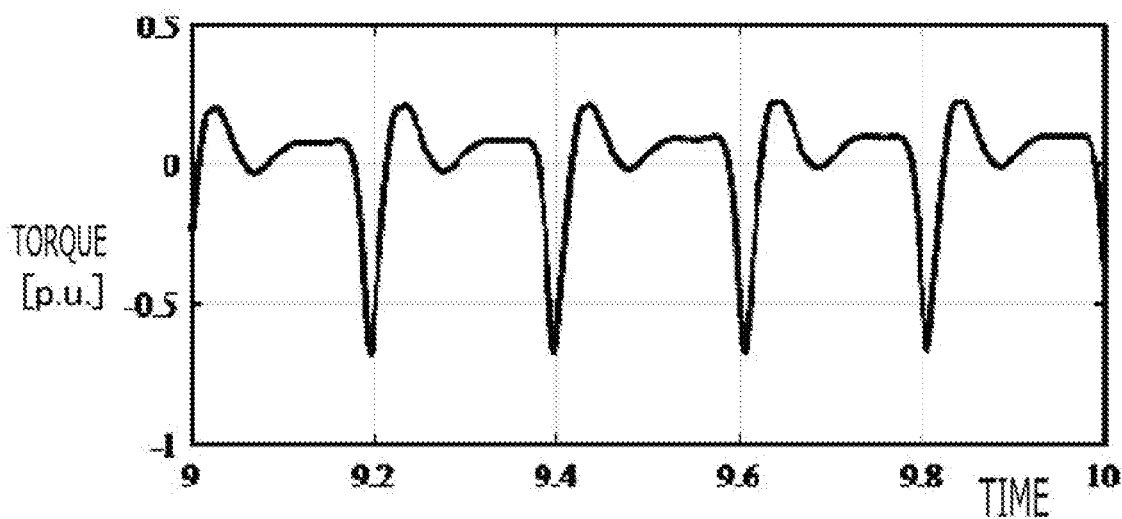

FIG. 8
WITH CORRECTION
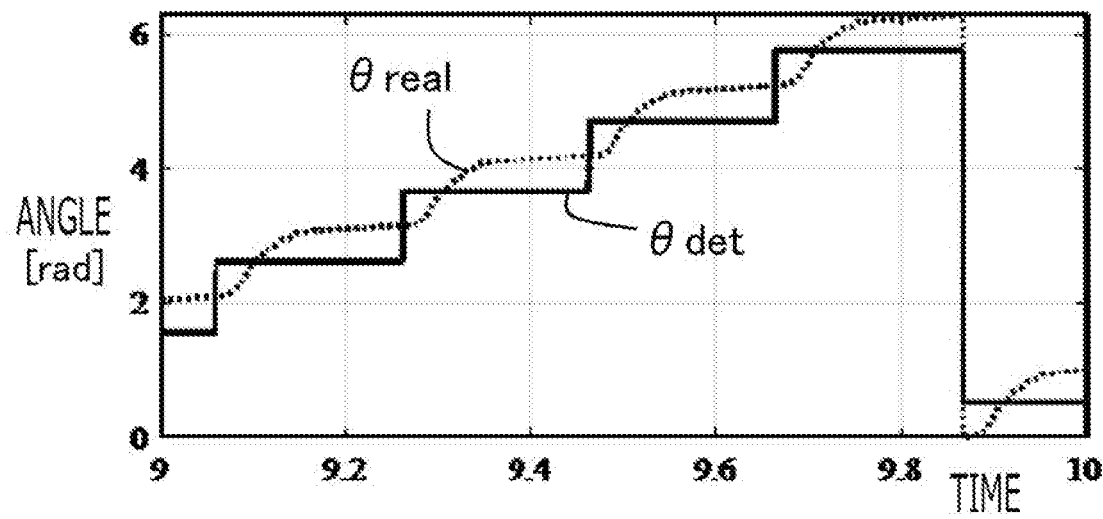
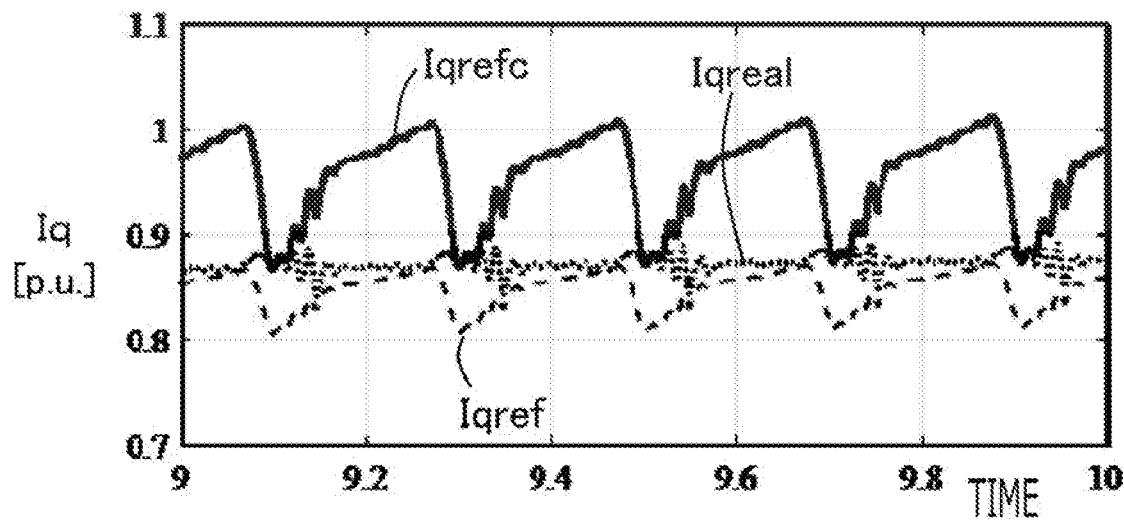
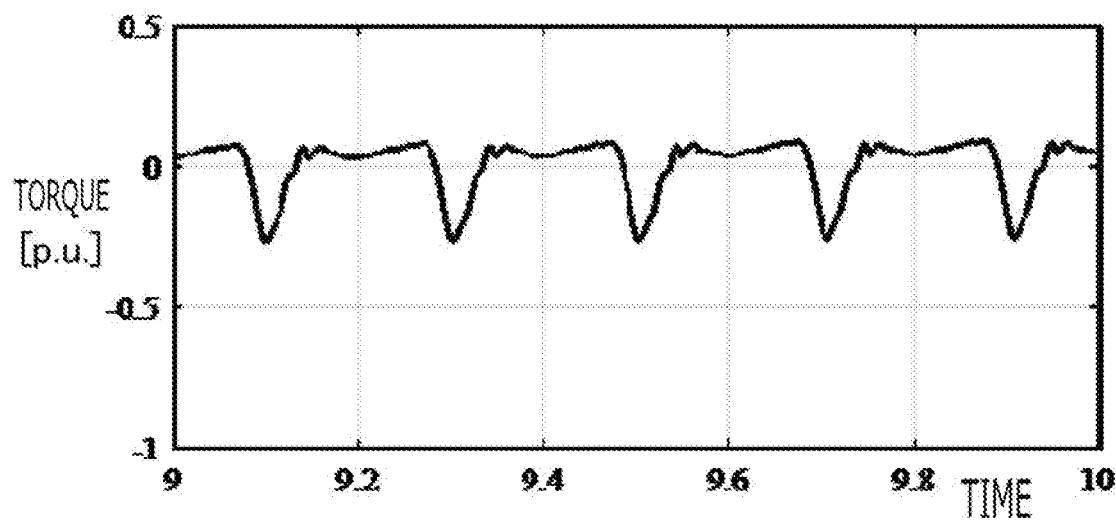

FIG. 15
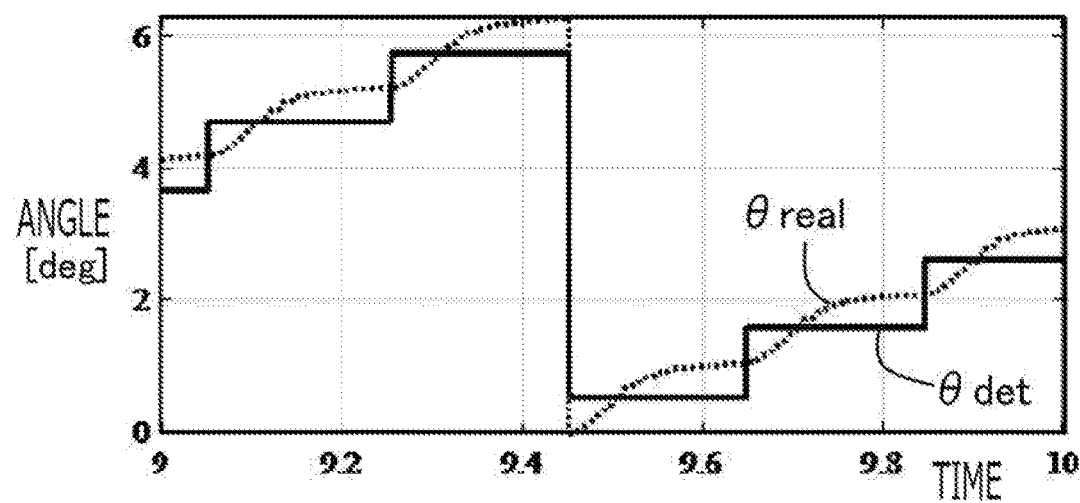
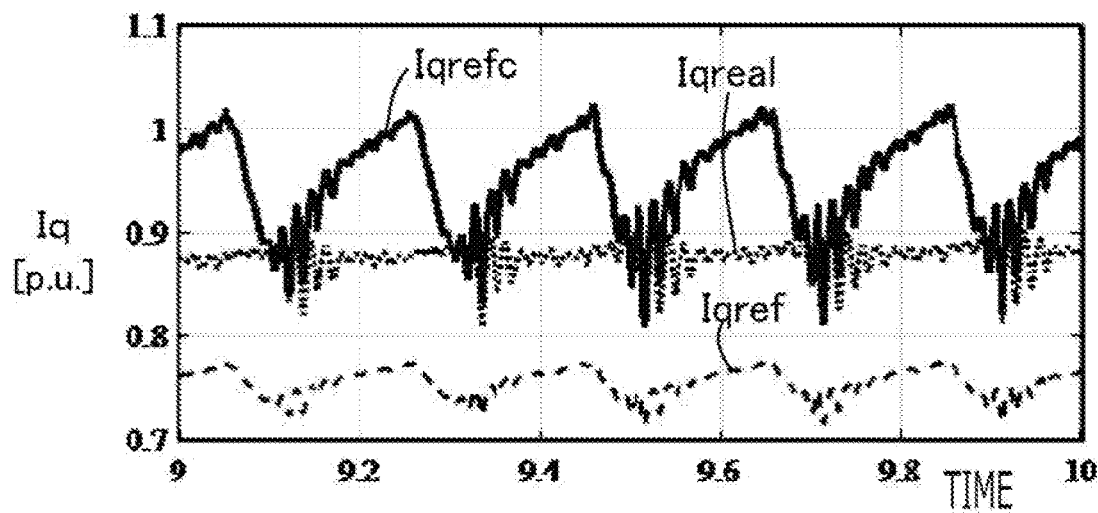
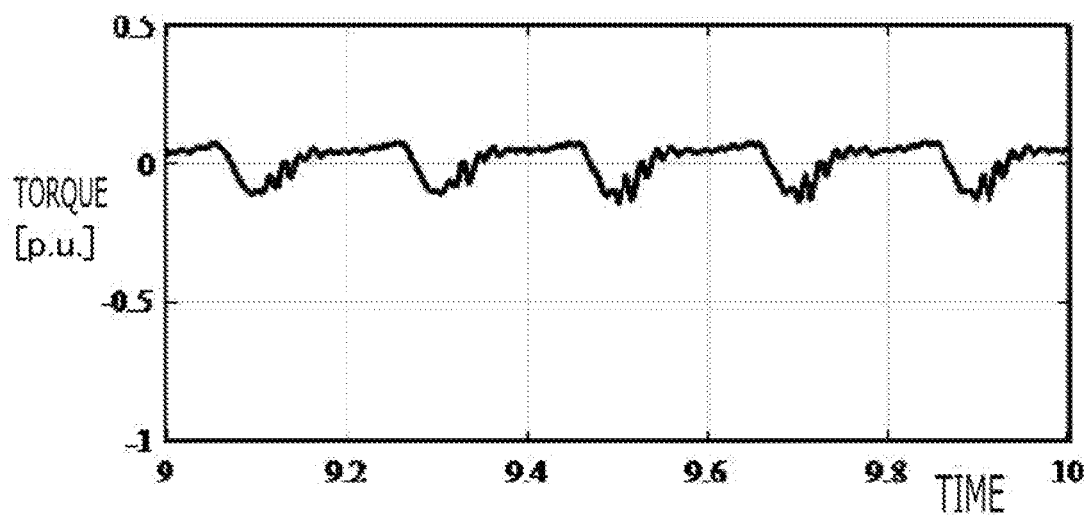

MOTOR CONTROLLER AND ELECTRIC POWER STEERING APPARATUS

CROSS REFERENCE TO RELATED APPLICATIONS

This application is a National Stage of International Application No. PCT/JP2017/040064, filed Nov. 7, 2017.

TECHNICAL FIELD

Present disclosure relates to a motor controller which reduces torque fluctuation, and an electric power steering apparatus provided with the motor controller.

BACKGROUND ART

There is a requirement that controls a motor using an inexpensive angle sensor with low detection resolution of angle for the purpose of the cost reduction of the motor controller. In the case of using an angle sensor with low angle detection resolution, there is a problem that the torque fluctuation occurs due to an error between the actual angle of the motor and the angle detection value.

As an example of conventional technology, there are technologies disclosed in from PLT 1 to PLT3. In the technology of PLT 1, the average value of the rotational speed of the motor is calculated from the output signal of the angle sensor, and the angle detection value is corrected using the integral value of the rotational speed.

In the technology of PLT 2, the torque fluctuation which occurs at the timing when the angle detection value is updated is suppressed by limiting the change rate of the current command value according to the rotational speed.

In the technology of PLT 3, by estimating the induced voltage and the inductance using current or voltage, the angle detection value in a period when the angle detection value detected based on the output signal of the angle sensor is not changing is estimated.

CITATION LIST

Patent Literature

PLT 1: JP 2011-117769 A
PLT 2: JP 2002-369569 A
PLT 3: JP 2006-304478 A

SUMMARY OF INVENTION

Technical Problem

However, in the technology of PLT 1, since the rotational speed is calculated from the time interval in which the angle detection value changes, calculation precision of the rotational speed is deteriorated as the rotational speed drops. Therefore, in the condition where the rotational speed is low, correction accuracy of the angle detection value is deteriorated and there is a possibility that the torque fluctuation may increase.

In the technology of PLT 2, since the torque fluctuation is suppressed by providing limitation in the change rate of the current command value, it is necessary to change the limit value of the change rate of the current command value appropriately according to the rotational speed. Therefore, in the condition where the calculation accuracy of the rotational speed is deteriorated, for example when the rotational speed changes suddenly, the change rate of the current command value cannot be set appropriately, and accordingly, there is a possibility that increase in the torque fluctuation by shortage of limitation of the change rate, and drop of torque by excessive limitation of the current command value may occur.

In the technology of PLT 3, in the low rotation speed state where the amplitude of the induced voltage drops, or when parameter of the motor, such as the induced voltage coefficient and the inductance, changes with temperature, the correction accuracy of the angle detection value is deteriorated, and the torque fluctuation increases. Since the estimation of the induced voltage coefficient or the inductance requires complex calculation, there is a problem that arithmetic load becomes high.

Then, even in the condition where the rotational speed of the motor is low, it is desired to provide a motor controller and an electric power steering apparatus which can suppress the torque fluctuation resulting from low detection resolution of the angle, with simple calculation.

Solution to Problem

A motor controller according to the present disclosure includes:

an angle detection unit that changes an angle detection value stepwise to a corresponding angle whenever an angle of a rotor of a motor having multi-phase windings reach each of a plurality of preliminarily set angles;

a current detection unit that detects a current flowing through the multi-phase windings;

a rotation state detection unit that detects a rotation state of the motor;

a current command calculation unit that calculates a current command value which flows into the multi-phase windings based on a detection value of the rotation state;

a current control unit that controls a current which flows into the multi-phase windings based on an angle detection value, a current detection value, and the current command value; and an angle error correction unit that, when a change frequency which is a reciprocal of a change period in which the angle detection value changes stepwise is lower than a cutoff frequency of a feedback control system which controls the rotation state, estimates an angle error correlation value which correlates with an angle detection error which is an error of the angle detection value with respect to an actual angle, based on the current command value, and corrects the current command value or the angle detection value based on an estimation value of the angle error correlation value, wherein the angle error correction unit changes the estimation value of the angle error correlation value so that an absolute value of the angle detection error increases with respect to increase in the current command value, and the absolute value of the angle detection error decreases with respect to decrease in the current command value.

An electric power steering apparatus according to the present disclosure includes:

the motor controller described above,
the motor, and
a driving force transmission mechanism which transmits an output torque of the motor to a steering device of a vehicle.

Advantage of Invention

According to the motor controller and the electric power steering apparatus according to the present disclosure, by estimating the angle error correlation value based on the current command value, and correcting the current command value or the angle detection value based on the angle error correlation value, the torque fluctuation by the angle detection error is suppressed, and accordingly, there is no necessity of estimating the induced voltage coefficient and the inductance using current and voltage. Therefore, even in the condition where the rotational speed of the motor is low, the torque fluctuation resulting from low detection resolution of the angle can be suppressed with simple calculation. Further, since change of the rotational speed does not influence estimation of the angle error correlation value, even in the case where the rotational speed changes suddenly, the angle error correlation value can be estimated accurately, and the torque fluctuation can be suppressed.

BRIEF DESCRIPTION OF THE DRAWINGS

FIG. 7 is a time chart showing an occurrence behavior of the torque fluctuation according to a comparative example;

FIG. 8 is a time chart showing a suppression effect of the torque fluctuation according to Embodiment 1 of the present disclosure;

FIG. 15 is a time chart showing the suppression effect of the torque fluctuation in the case of the adjustment gain K=2 according to Embodiment 4 of the present disclosure;

DETAILED DESCRIPTION OF THE EMBODIMENTS

Embodiment 1

Figure 1:
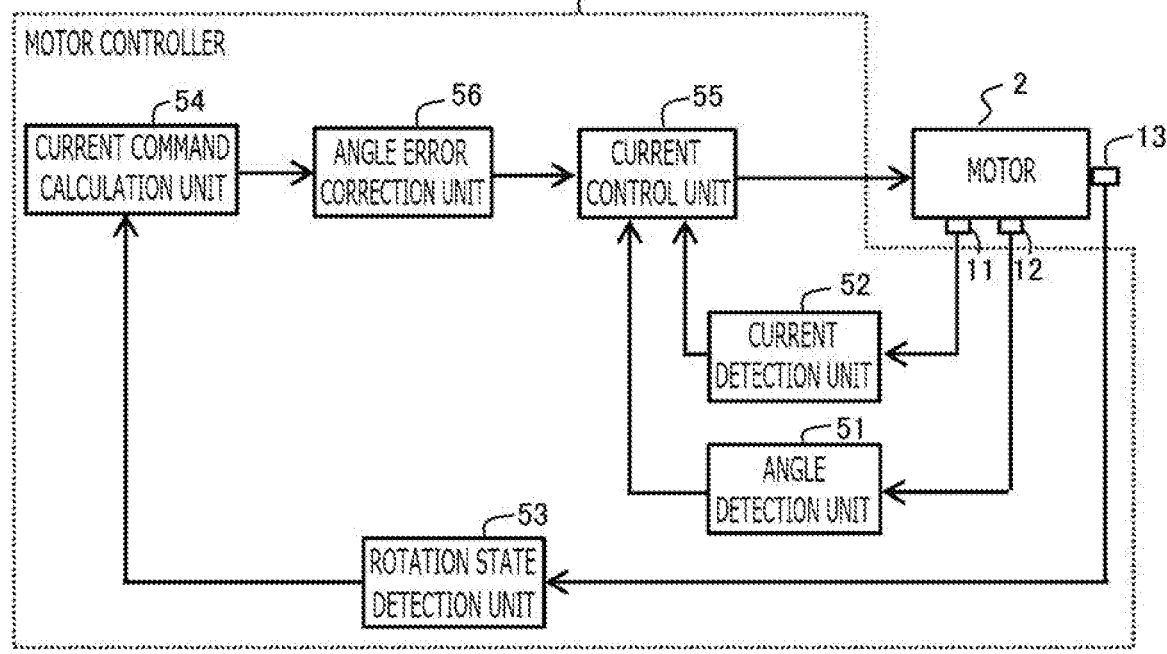
FIG. 1 is a schematic configuration diagram of the motor controller and the motor according to Embodiment 1 of the present disclosure.
Figure 2:
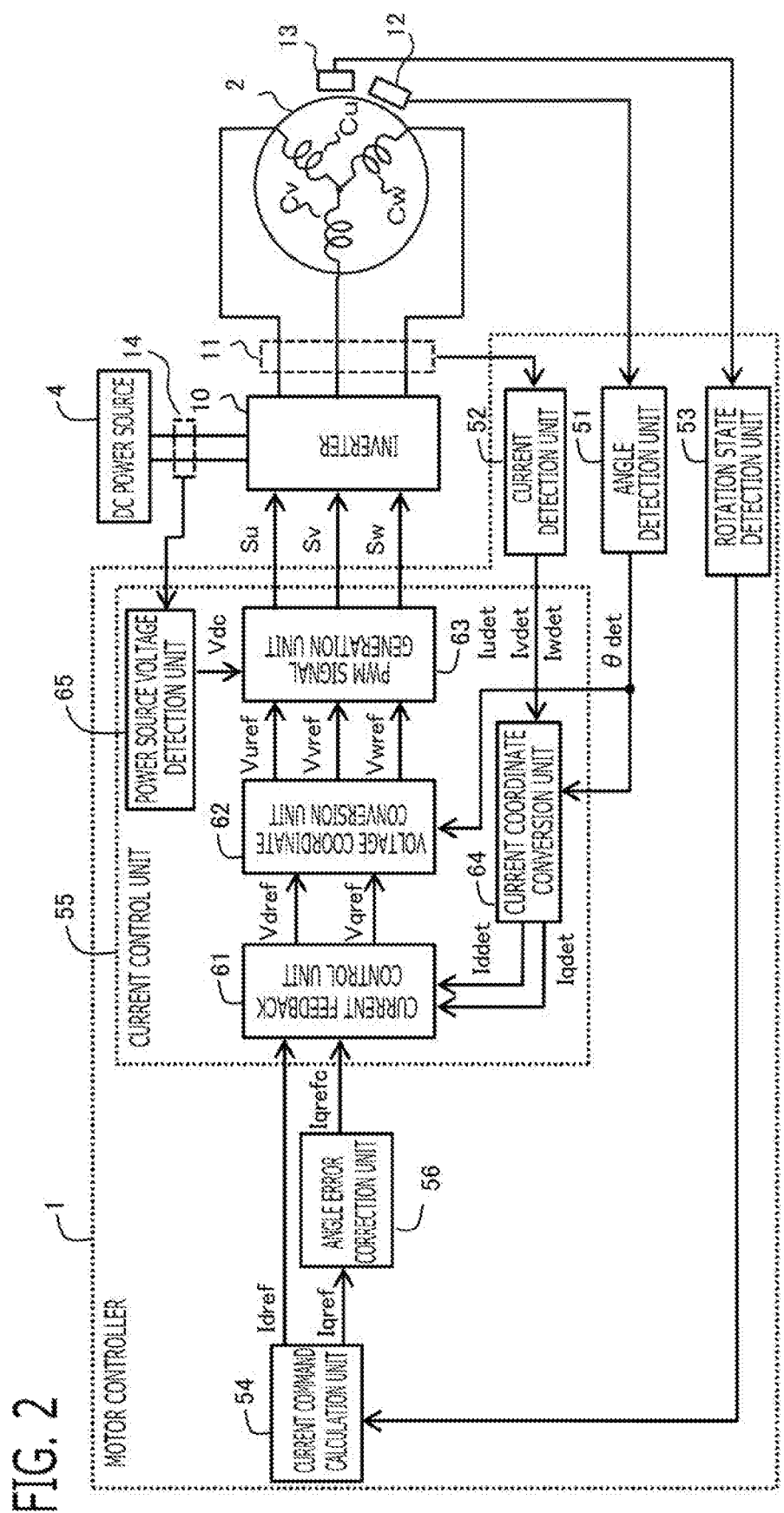
FIG. 2 is a detailed configuration diagram of the motor controller and the motor according to Embodiment 1 of the present disclosure.

A motor controller 1 according to Embodiment 1 will be explained with reference to drawings. FIG. 1 is a schematic configuration diagram of the motor controller 1 and the motor 2 according to the present embodiment. FIG. 2 is a detailed configuration diagram of the motor controller 1 and the motor 2 according to the present embodiment.

The motor 2 is provided with a stator fixed to a nonrotation member, and a rotor which is disposed at radial-direction inner side of the stator and is pivotably supported by a nonrotation member. In the present embodiment, the motor 2 is a permanent magnet type synchronous motor. Multi-phase windings (in this example, three-phase windings Cu, Cv, Cw) are wound around the stator, and the permanent magnet is provided in the rotor. An angle sensor 12 which detects an angle of the rotor is provided in the rotor. A torque sensor 13 which detects an output torque of the rotor is provided in a rotary shaft of the rotor.

The motor 2 is electrically connected to a DC power source 4 via an inverter 10 which performs a DC/AC conversion. The motor 2 has at least the function of a motor which receives electric power supply from the DC power source 4 and generates power. The motor 2 may have the function of a generator in addition to the function of the motor.

The inverter 10 is a DC/AC conversion device that performs electric power conversion between the DC power source 4 and the motor 2. The inverter 10 is configured into a bridge circuit in which three sets of two switching devices, which are connected in series between a positive pole wire connected to a positive pole of the DC power source 4 and a negative pole wire connected to a negative pole of the DC power source 4, are provided correspondingly to the windings of each phase of three phases (Uphase, Vphase, Wphase). A connection node connected in series to the positive pole side switching device and the negative pole side switching device is connected to the winding of the corresponding phase. An IGBT (Insulated Gate Bipolar Transistor) in which a free wheel diode is connected in reversely parallel, a MOSFET (Metal Oxide Semiconductor Field Effect Transistor), and the like are used for the switching device.

The inverter 10 is provided with a current sensor 11 for detecting current which flows into each winding. The current sensor 11 is provided on the wire of each phase which connects the series circuit of the switching devices and the winding. The current sensor 11 may be shunt resistance arranged in a position in series with the positive electrode side or the negative electrode side switching device of each phase of three phases. In this case, the upstream side terminal and the downstream side terminal of the shunt resistance of each phase are independently connected to the motor controller 1, respectively, and the current of each phase is detected.

Figure 3:
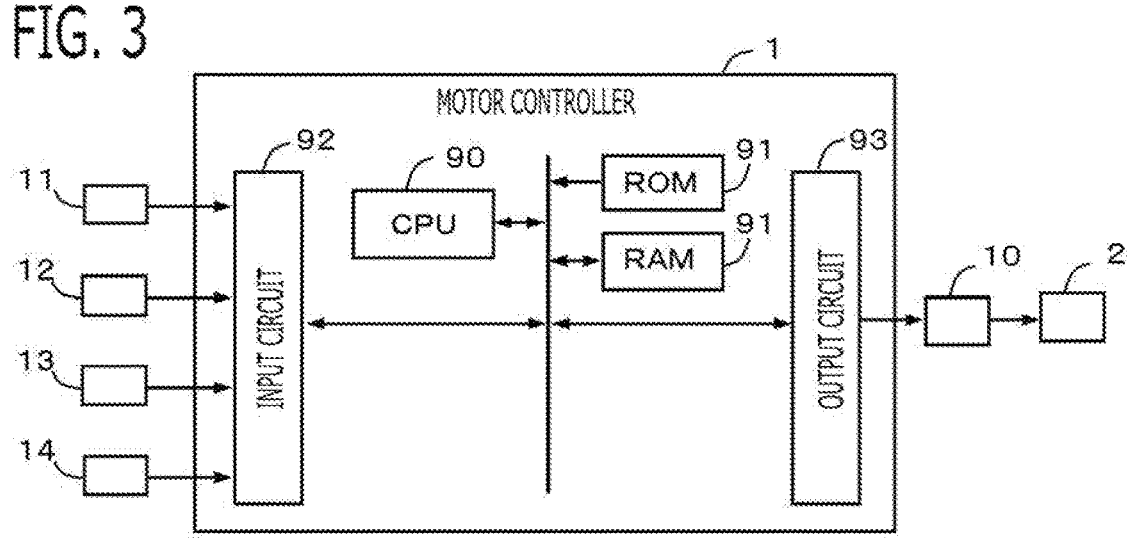
FIG. 3 is a hardware configuration diagram of the motor controller according to Embodiment 1 of the present disclosure.

The motor controller 1 is a controller which controls the motor 2 via the inverter 10. As shown in FIG. 1 and FIG. 2, the motor controller 1 is provided with functional parts of an angle detection unit 51, a current detection unit 52, a rotation state detection unit 53, a current command calculation unit 54, a current control unit 55, an angle error correction unit 56, and the like. Respective control units 51 through 56 and the like provided in the motor controller 1 are realized by a processing circuit included in the motor controller 1. Specifically, as illustrated in FIG. 3, the motor controller 1 includes, as a processing circuit, an arithmetic processor (computer) 90 such as a CPU (Central Processing Unit), storage apparatuses 91 that exchange data with the arithmetic processor 90, an input circuit 92 that inputs external signals to the arithmetic processor 90, an output circuit 93 that outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, there are provided a RAM (Random Access Memory) which can read data and write data from the arithmetic processor 90, a ROM (Read Only Memory) which can read data from the arithmetic processor 90, and the like. The input circuit 92 is connected with various kinds of sensors and switches and is provided with an A/D converter and the like for inputting output signals from the sensors and the switches to the arithmetic processor 90. The output circuit 93 is connected with electric loads such as the switching devices, and is provided with a driving circuit and the like for outputting a control signal from the arithmetic processor 90. In the present embodiment, the input circuit 92 is connected with the current sensor 11, the angle sensor 12, the torque sensor 13, the voltage sensor 14, and the like. The output circuit 93 is connected to the inverter 10 (switching devices or a gate driving circuit of the switching devices).

Then, the arithmetic processor 90 runs software items (programs) stored in the storage apparatus 91 such as a ROM and collaborates with other hardware devices in the motor controller 1, such as the storage apparatus 91, the input circuit 92, and the output circuit 93, so that the respective functions of the control units 51 through 56 included in the motor controller 1 are realized. Setting data items such as determination value and table data to be utilized in the control units 51 through 56 are stored, as part of software items (programs), in the storage apparatus 91 such as a ROM. Each function of the motor controller 1 will be described in detail below.

<Angle Detection Unit 51>

Figure 4:
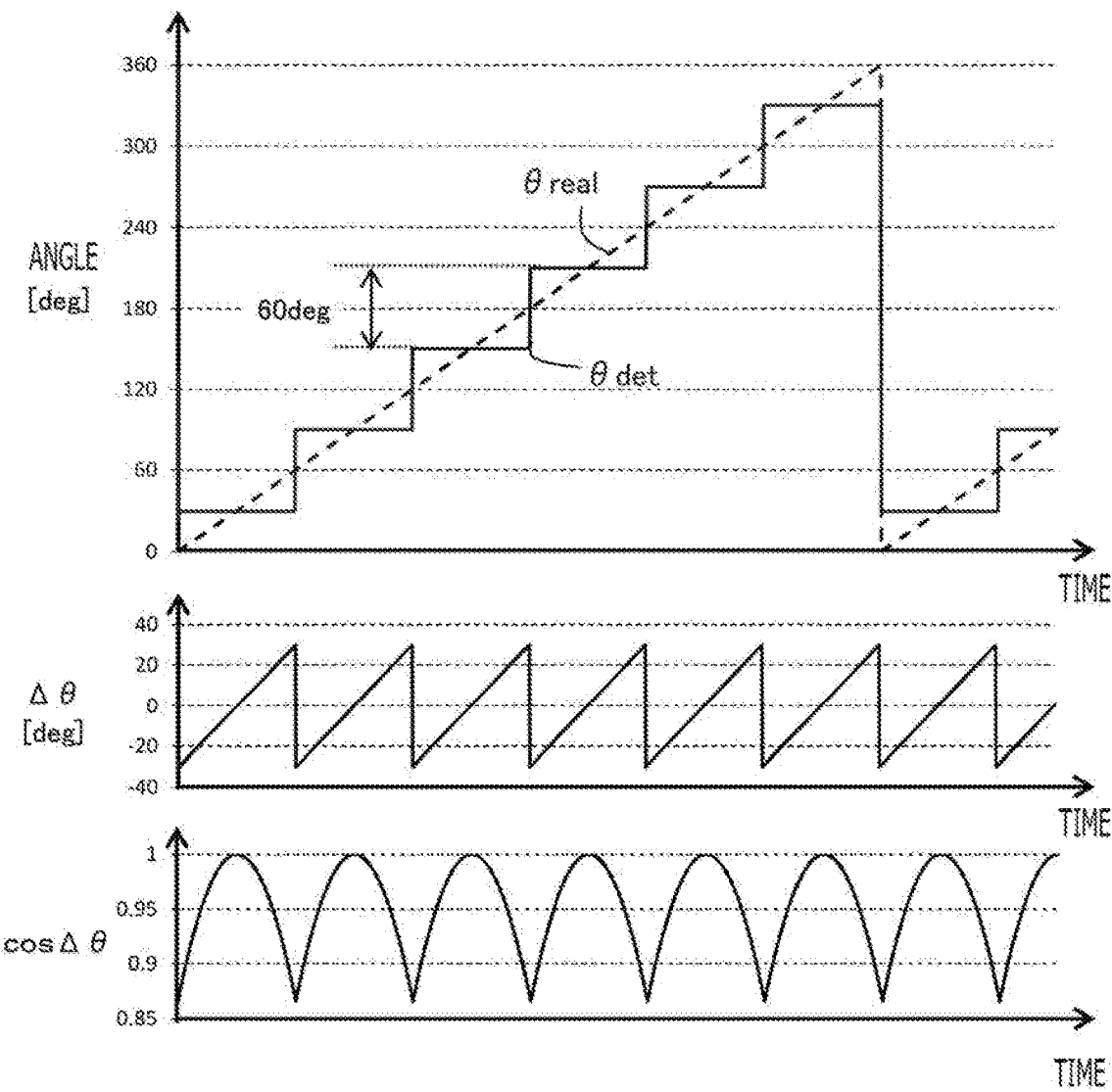
FIG. 4 is a time chart showing the behavior of the angle detection value according to Embodiment 1 of the present disclosure.

The angle detection unit 51 detects an angle θdet of the rotor. The angle detection unit 51 changes the angle detection value θdet stepwise to a corresponding angle whenever the angle of the rotor reaches each of a plurality of preliminarily set angles. In the present embodiment, the angle detection unit 51 detects the angle θdet of the rotor based on an output signal of the angle sensor 12. The angle sensor 12 is a Hall sensor. Three Hall elements are provided at positions of the stator which oppose the permanent magnet of the rotor with an angle interval of 120 degrees in electrical angle. Therefore, as shown in FIG. 4, whenever the rotor rotates 60 degrees in the electrical angle, the angle detection value θdet changes stepwise by 60 degrees. The angle detection value θdet changes stepwise in order of 30 degrees, 90 degrees, 150 degrees, 210 degrees, 270 degrees, and 330 degrees.

The angle detection unit 51 calculates a rotational speed of the rotor based on a time change of the angle detection value θdet. In the present embodiment, the angle detection unit 51 calculates the rotational speed of the rotor by dividing an angle interval in which the angle detection value θdet changes stepwise by a period in which the angle detection value θdet changes stepwise. As the angle sensor 12, other kinds of sensors, such as a rotary encoder, in which the angle detection value θdet changes stepwise, may be used.

<Current Detection Unit 52>

The current detection unit 52 detects a current which flows into the multi-phase windings. In the present embodiment, based on the output signal of the current sensor 11, the current detection unit 52 detects a U phase current Iudet which flows into the U phase winding, a V phase current Ivdet which flows into the V phase winding, and a W phase current Iwdet which flows into the W phase winding.

<Rotation State Detection Unit 53>

The rotation state detection unit 53 detects a rotation state of the motor 2. In the present embodiment, the rotation state detection unit 53 detects an output torque of the motor 2 as the rotation state. In the present embodiment, the rotation state detection unit 53 detects the output torque of the motor 2 based on an output signal of the torque sensor 13.

<Current Command Calculation Unit 54>

The current command calculation unit 54 calculates a current command value which flows into three-phase windings, based on the detection value of the output torque of the motor 2 as the rotation state. In the present embodiment, the current command calculation unit 54 performs feedback control that changes the current command value so that the detection value of output torque approaches a target torque. Various kinds of feedback control, such as PID control, is used. The current command calculation unit 54 calculates at least a current command value Iqref of q-axis, which is a current command obtained by expressing currents which flow into the three-phase windings Cu, Cv, Cw in a dq-axis rotating coordinate system. In the present embodiment, the current command calculation unit 54 also calculates a current command value Idref of d-axis. The dq-axis rotating coordinate system consists of a d-axis defined in the direction of the N pole (magnetic pole position) of the permanent magnet provided in the rotor and a q-axis defined in the direction advanced to d-axis by 90 degrees in the electrical angle, and which is the two-axis rotating coordinate system which rotates synchronizing with rotation of the rotor in the electrical angle. When a current of q-axis increases, the output torque of the motor 2 increases, and when the current of q-axis decreases, the output torque of the motor 2 decreases.

<Current Control Unit 55>

The current control unit 55 controls the current which flow into the three-phase windings based on the angle detection value θdet, the current detection value, and the current command value. In the present embodiment, the current control unit 55 controls the current which flows into the three-phase windings on the dq-axis rotating coordinate system which rotates according to the angle detection value θdet. As shown in FIG. 2, the current control unit 55 is provided with a current feedback control unit 61, a voltage coordinate conversion unit 62, a PWM signal generation unit 63, a current coordinate conversion unit 64, and a power source voltage detection unit 65.

The power source voltage detection unit 65 detects a power source voltage Vdc of the DC power source 4 based on an output signal of the voltage sensor 14. By performing a three-phase/two-phase conversion and a rotating coordinate conversion based on the angle detection value θdet, the current coordinate conversion unit 64 converts the current detection values Iudet, Ivdet, Iwdet of three-phase into the current detection value Iddet of d-axis and the current detection value Iqdet of q-axis which are expressed in the dq-axis rotating coordinate system rotating according to the angle detection value θdet.

The current feedback control unit 61 performs a current feedback control that changes the voltage command value Vdref of d-axis and the voltage command value Vqref of q-axis, which expressed the voltage command signals applied to the motor 2 in the dq-axis rotating coordinate system, by PI control or the like, so that the current detection values Iddet, Iqdet of d-axis and q-axis approach the current command values Idref, Iqref of d-axis and q-axis. In the present embodiment, a current command value Iqrefc of q-axis after correction by the angle error correction unit 56 described below is used for the current command value Iqref of q-axis.

After that, the voltage coordinate conversion unit 62 converts the voltage command values Vdref, Vqref of d-axis and q-axis into three-phase AC voltage command values Vuref, Vvref, Vwref, which are AC voltage command values to the respective three-phase windings, by performing a fixed coordinate conversion and a two-phase/three-phase conversion based on the angle detection value θdet.

The PWM signal generation unit 63 compares each of the three-phase AC voltage command values Vuref, Vvref, Vwref with a carrier wave (a triangular wave) which has a vibration width of the power source voltage Vdc and vibrates at a carrier frequency; and then turns on a rectangular pulse wave when the AC voltage command value exceeds the carrier wave, and turns off the rectangular pulse wave when the AC voltage command value bellows the carrier wave. The PWM signal generation unit 63 outputs the rectangular pulse waves of respective three phases as inverter control signals Su, Sv, Sw of respective three phases to the inverter 10, and turns on/off the respective switching devices of the inverter 10.

<Estimation Principle of Angle Detection Error of the Angle Error Correction Unit 56>

As shown in FIG. 4, since the angle detection value θdet changes stepwise whenever the actual angle θreal rotates 60 degrees, an error with the actual angle θreal occurs. An angle detection error Δθ (=θreal−θdet) varies periodically in a step change period which is a period in which the angle detection value θdet changes stepwise.

Then, since the currents which flow into the three-phase windings are controlled based on the angle detection value θdet, a periodic control error occurs in the currents of three-phase windings by periodic variation of the angle detection error Δθ, and a periodic variation occurs in the output torque of the motor 2. Then, by estimating the angle detection error Δθ and compensating influence of the angle detection error Δθ, it is desired to suppress periodic torque fluctuation.

Figure 5:
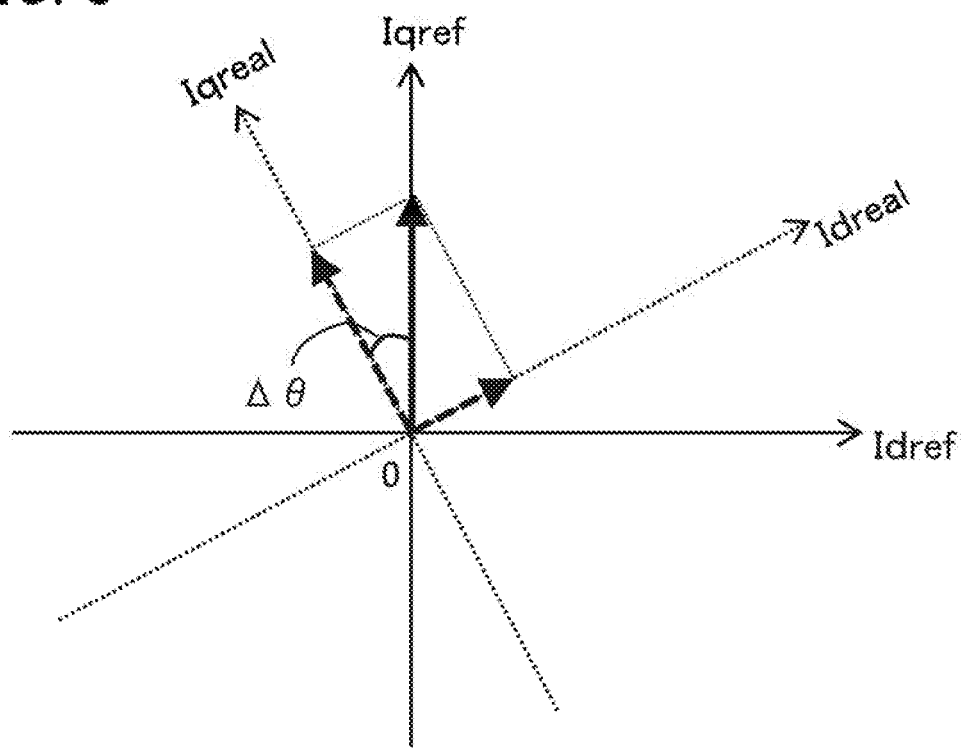
FIG. 5 is a figure explaining a drop of the q-axis current by the angle detection error according to Embodiment 1 of the present disclosure.

First, derivation of a theoretical formula for estimating the angle detection error Δθ will be explained. As shown in FIG. 5 and an equation (1), when the angle detection error Δθ occurs, the actual current Iqreal of q-axis becomes a value obtained by multiplying a cosine value of the angle detection error Δθ to the current command value Iqref of q-axis. Therefore, when the angle detection error Δθ occurs, since the actual current Iqreal of q-axis drops by the cosine value with respect to the current command value Iqref of q-axis, and the output torque is generally proportional to the actual current Iqreal of q-axis, the output torque drops.

$$Iqreal = Iqref \times \cos \Delta\theta$$

$$\Delta\theta = \theta real - \theta det \tag{1}$$

On the other hand, when a variation frequency of the output torque by the angle detection error Δθ is lower than a cutoff frequency of the feedback control system which controls the output torque by the current command calculation unit 54, even if a torque fluctuation occurs, the output torque follows the target torque. That is to say, since the current command calculation unit 54 increases the current command value Iqref of q-axis so as to compensate for a drop of the output torque by the angle detection error Δθ, the actual current Iqreal of q-axis can be considered to be constant. Therefore, since a differential value of the actual current Iqreal of q-axis can be considered to be 0, an equation (2) is obtained from the relationship of the equation (1). The equation (2) is established because the load torque is considered to be constant within an interval when the angle detection value θdet is not changing. That is to say, it is because it can be considered that change of the current command value Iqref of q-axis occurs due to the angle detection error Δθ.

$$\frac{d}{dt}Iqreal(t) = \frac{d}{dt}(Iqref(t) \times \cos\Delta\theta(t)) = 0 \tag{2}$$

If the differential operation of the second part of the equation (2) is developed and rearranged, and the cosine value cos Δθ of the angle detection error is replaced to an estimation value cos Δθ* of the cosine value of the angle detection error, an equation (3) is obtained.

$$\frac{d}{dt}(Iqref(t) \times \cos\Delta\theta(t)) = \tag{3}$$

$$\frac{d}{dt}(Iqref(t)) \times \cos\Delta\theta(t) + Iqref(t) \times \frac{d}{dt}(\cos\Delta\theta(t)) = 0$$

$$\therefore \frac{d}{dt}(\cos\Delta\theta^*(t)) = \frac{-\frac{d}{dt}(Iqref(t))}{Iqref(t)}\cos\Delta\theta^*(t)$$

The variation frequency of the output torque by the angle detection error Δθ becomes a step change frequency which is a reciprocal of a step change period in which the angle detection value θdet changes stepwise. Therefore, when the step change frequency of the angle detection value θdet is lower than the cutoff frequency of the feedback control system of the output torque, the equation (3) expresses that the estimation value cos Δθ* of the cosine value of the angle detection error can be estimated based on a ratio between the current command value Iqref of q-axis and the differential value of the current command value Iqref of q-axis.

As shown in the equation (3) and the equation (4), since the differential value of the estimation value cos Δθ* of the cosine value of the angle detection error becomes a negative value when the differential value of the current command value Iqref of q-axis becomes a positive value and the current command value Iqref of q-axis increases, it is found that the estimation value cos Δθ* of the cosine value of the angle detection error may be decreased, and an absolute value of the estimation value Δθ* of the angle detection error may be increased. On the other hand, since the differential value of the estimation value cos Δθ* of the cosine value of the angle detection error becomes a positive value when the differential value of the current command value Iqref of q-axis becomes a negative value and the current command value Iqref of q-axis decreases, it is found that the estimation value cos Δθ* of the cosine value of the angle detection error may be increased, and the absolute value of the estimation value Δθ* of the angle detection error may be decreased.

$$1) \frac{d}{dt}(Iqref(t)) > 0 \quad (4)$$

$$\frac{d}{dt}(\cos\Delta\theta^*(t)) = \frac{-\frac{d}{dt}(Iqref(t))}{Iqref(t)}\cos\Delta\theta^*(t) < 0$$

$$2) \frac{d}{dt}(Iqref(t)) < 0$$

$$\frac{d}{dt}(\cos\Delta\theta^*(t)) = \frac{-\frac{d}{dt}(Iqref(t))}{Iqref(t)}\cos\Delta\theta^*(t) > 0$$

It is found from the equation (3) that the estimation value cos Δθ* of the cosine value of the angle detection error can be estimated based on only the current command value Iqref of q-axis, and state of the rotational speed and parameter of the motor 2 are unnecessary.

<Estimation of the Angle Detection Error of the Angle Error Correction Unit 56>

Then, when the step change frequency which is a reciprocal of the step change period in which the angle detection value θdet changes stepwise is lower than the cutoff frequency of the feedback control system which controls the output torque of the motor 2, the angle error correction unit 56 estimates an angle error correlation value which correlates with the angle detection error Δθ which is an error of the actual angle θreal with respect to the angle detection value θdet, based on the current command value. The angle error correction unit 56 changes the estimation value of the angle error correlation value so that an absolute value of the angle detection error 6A increases with respect to increase in the current command value, and the absolute value of the angle detection error Δθ decreases with respect to decrease in the current command value.

In the present embodiment, the angle error correction unit 56 estimates the cosine value cos Δθ* of the angle detection error as the angle error correlation value, based on the current command value Iqref of q-axis as the current command value. The angle error correction unit 56 estimates the angle error correlation value, when the rotational speed of the motor 2 is lower than a preliminarily set estimation permission rotational speed. The estimation permission rotational speed is preliminarily set corresponding to the rotational speed at which the step change frequency becomes equal to the cutoff frequency of the feedback control system.

The angle error correction unit 56 calculates the estimation value cos Δθ* of the cosine value of the angle detection error, based on the ratio between the current command value Iqref of q-axis and the differential value of the current command value Iqref of q-axis.

Figure 6:
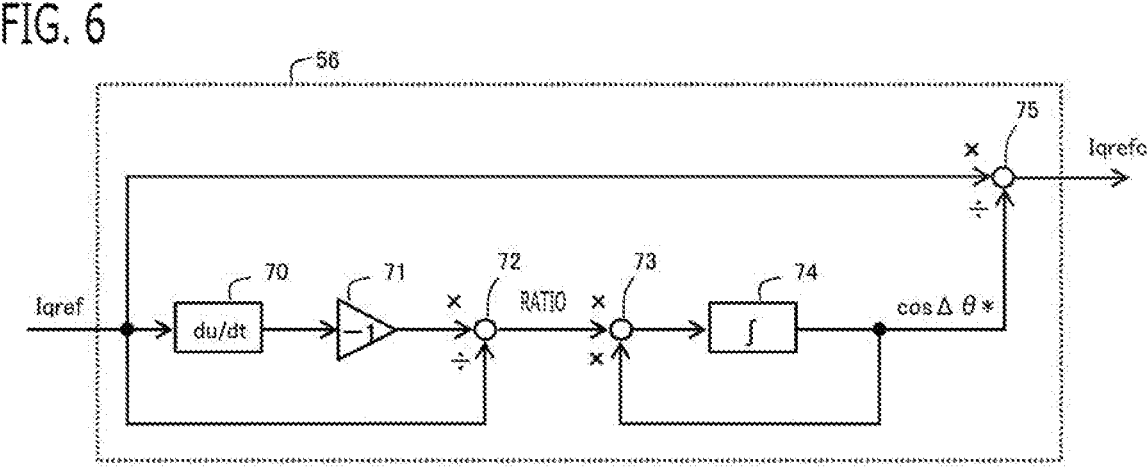
FIG. 6 is a block diagram of the angle error correction unit according to Embodiment 1 of the present disclosure.

In the present embodiment, as shown in FIG. 6 which expressed the equation (3) by block diagram, the angle error correction unit 56 calculates the differential value of the current command value Iqref of q-axis by a differentiator 70; multiplies −1 to the differential value by a gain multiplier 71; calculates the ratio by dividing a value obtained by multiplying −1 to the differential value by the current command value Iqref of q-axis by a divider 72; calculates a value obtained by multiplying a feedback value of the estimation value cos Δθ* of the cosine value of the angle detection error to the ratio by a multiplier 73; and calculates a value obtained by integrating with the calculated value of the multiplier 73 by an integrator 74, as the estimation value cos Δθ* of the cosine value of the angle detection error.

In FIG. 6, it is configured to use the integrator 74, but it may be configured to use a differentiator by modifying the equation (3). Although the equation (3) and FIG. 6 are expressed by a continuous system, when it is installed in software, it can be realized by discretizing the differentiator 70 and the integrator 74 with discretization methods, such as backward difference.

At timing when the angle detection value θdet changed stepwise, since a relationship between the actual angle θreal and the angle detection value θdet is uniquely decided, and the angle detection value θdet becomes a preliminarily set angle, the angle detection error Δθ also becomes a preliminarily set angle, and the cosine value cos Δθ of the angle detection error becomes a preliminarily set value. Then, the angle error correction unit 56 resets the estimation value cos Δθ* of the cosine value of the angle detection error to a preliminarily set initial value at timing when the angle detection value changed stepwise. In the present embodiment, as shown in FIG. 4, since the angle detection error Δθ becomes −30 degrees and the cosine value cos Δθ of the angle detection error becomes 0.866 at the timing when the angle detection value θdet changed stepwise, the initial value is preliminarily set to 0.866. When it is configured as FIG. 6, an integral value of the integrator 74 is reset to the initial value (0.866) at the timing when the angle detection value θdet changed stepwise.

Since a time delay exists in the output signal of the angle sensor 12, the relationship between the actual angle θreal and the angle detection value θdet may not be uniquely decided at the time when the angle detection value θdet changed stepwise. In this case, at timing on the basis of the timing when the angle detection value θdet changed stepwise, the angle error correction unit 56 may reset the estimation value cos Δθ* of the cosine value of the angle detection error to a preliminarily set initial value. For example, at timing when a preliminarily set waiting time elapsed after the angle detection value θdet changed stepwise, the angle error correction unit 56 resets the estimation value cos Δθ* of the cosine value of the angle detection error to the initial value.

Due to influence of detection resolution of the angle sensor 12 and the like, if the angle detection errors Δθ0 between the actual angle θreal at the time when the angle detection value θdet changed stepwise and the angle detection value θdet are different at every angle of changing stepwise, the cosine value cos Δθ0 of the angle detection error 90 is set to an initial value corresponding to an angle of changing stepwise whenever the angle detection value θdet changes stepwise.

<Correction by the Estimation Value of the Angle Error Correction Unit 56>

Although the current command value Iqref of q-axis is operated by the feedback control of the output torque by the current command calculation unit 54 so that the torque reduction by the angle detection error Δθ is compensated, there is a limit in the disturbance suppression performance of the feedback control, and torque fluctuation resulting from the angle detection error Δθ cannot be suppressed enough only by the feedback control.

Then, the angle error correction unit 56 corrects the current command value Iqref of q-axis based on the estimation value cos Δθ* of the cosine value of the angle detection error. According to this configuration, since the current command value Iqref of q-axis is corrected by feedforward based on the estimation value cos Δθ* of the cosine value of the angle detection error which correlates with the angle detection error, a suppression effect of the torque fluctuation resulting from the angle detection error Δθ can be improved.

From the equation (1), since the actual current Iqreal of q-axis drops by a value obtained by multiplying the cosine value cos Δθ of the angle detection error to the current command value Iqref of q-axis, it is found that the current command value Iqref of q-axis may be divided by the cosine value cos Δθ of the angle detection error in order to compensate the drop. Accordingly, as shown in FIG. 6 and an equation (5), the angle error correction unit 56 calculates a value obtained by multiplying a reciprocal of the estimation value cos Δθ* of the cosine value of the angle detection error as a correction coefficient to the current command value Iqref of q-axis by a divider 75, as the current command value Iqrefc of q-axis after correction. The current control unit 55 performs the current feedback control based on the current command value Iqrefc of q-axis after correction.

$$Iqrefc = Iqref \times \frac{1}{\cos\Delta\theta^*} \quad (5)$$

By referring to a table data in which a relationship between the cosine value cos Δθ of the angle detection error and the correction coefficient is preliminarily set, the angle error correction unit 56 may calculate the correction coefficient corresponding to the estimation value cos Δθ* of the cosine value of the angle detection error, and may calculate the current command value Iqrefc of q-axis after correction by multiplying the correction coefficient to the current command value Iqref of q-axis.

<Suppression Effect of the Torque Fluctuation by the Angle Error Correction Unit 56>

Suppression effect of the torque fluctuation by the angle error correction unit 56 will be explained. FIG. 7 is a time chart according to a comparative example which is not correcting the current command value Iqref of q-axis. FIG. 8 is a time chart according to the present embodiment which is correcting the current command value Iqref of q-axis. By correcting the current command value Iqref of q-axis, the torque fluctuation can be reduced significantly.

Figure 9:
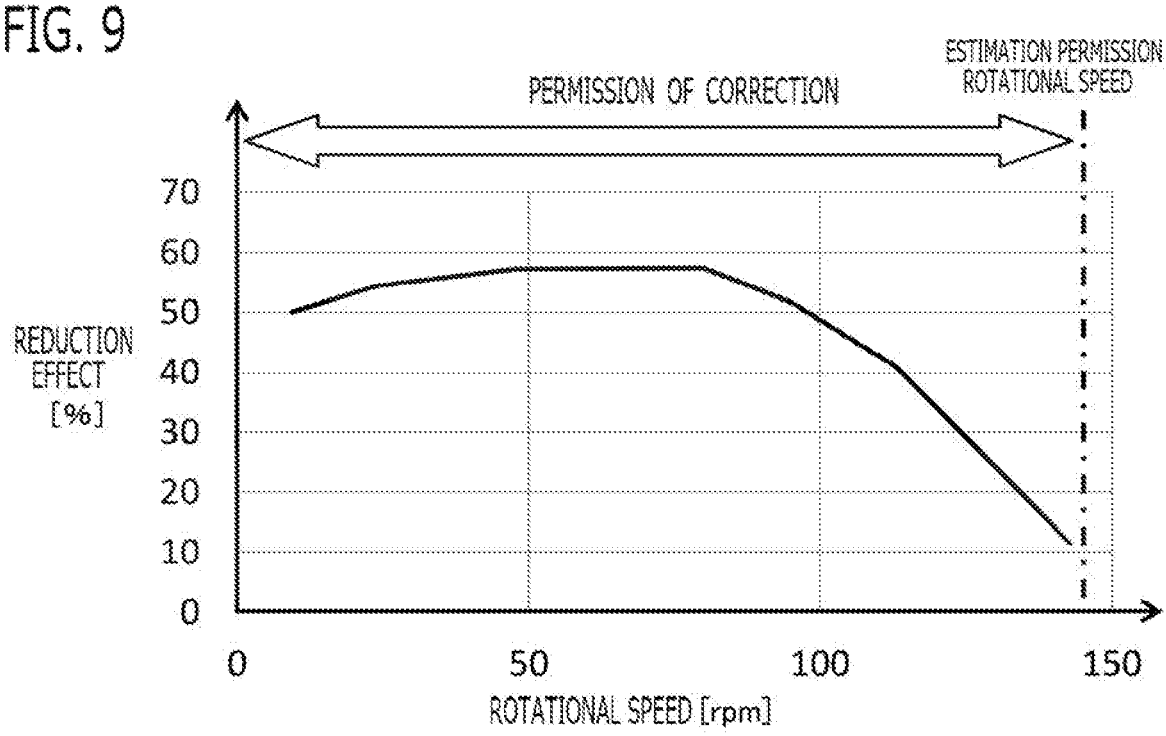
FIG. 9 is a figure explaining a reduction effect of the torque fluctuation according to Embodiment 1 of the present disclosure.

FIG. 9 shows a reduction effect of the torque fluctuation by correction of the current command value Iqref of q-axis at each rotational speed. Reduction effect=(Torque fluctuation without correction−Torque fluctuation with correction)/Torque fluctuation without correction×100%. Accordingly, as the reduction effect is higher, the torque fluctuation with correction decreases with respect to the torque fluctuation without correction of the current command value Iqref of q-axis. As the rotational speed increases, the reduction effect of the torque fluctuation by correction of the current command value Iqref of q-axis decreases. This is because, as the rotational speed increases, the step change frequency of the angle detection value θdet increases and approaches the cutoff frequency of the feedback control system of the output torque, the equation (2) which becomes the estimation principle of the cosine value cos Δθ of the angle detection error is hardly established, and the estimation accuracy of the cosine value cos Δθ of the angle detection error is deteriorated.

Accordingly, as shown in an example of FIG. 9, the estimation permission rotational speed is preliminarily set to a rotational speed corresponding to the cutoff frequency at which the estimation accuracy is deteriorated and the reduction effect of the torque fluctuation is deteriorated. When the rotational speed is lower than the estimation permission rotational speed, the angle error correction unit 56 estimates the cosine value cos Δθ* of the angle detection error, and corrects the current command value Iqref of q-axis based on the estimation value cos Δθ* of the cosine value of the angle detection error.

Alternatively, omitting the processing which determines whether the rotational speed is lower than the estimation permission rotational speed, the angle error correction unit 56 may estimate the cosine value cos Δθ* of the angle detection error at any rotational speed, and correct the current command value Iqref of q-axis based on the estimation value cos Δθ* of the cosine value of the angle detection error. Even with this configuration, when the rotational speed is higher than the estimation permission rotational speed corresponding to the cutoff frequency, the estimation value cos Δθ* of the cosine value of the angle detection error becomes about 1, and the function of the angle error correction unit 56 stops substantially.

This principle will be explained below. When the step change frequency is higher than the cutoff frequency of the feedback control system, variation by the angle detection error hardly appears in the current command value. This is because, as the rotational speed increases, the frequency of the torque fluctuation resulting from the angle detection error increases, accordingly the torque fluctuation attenuates in the rotary shaft of the rotor, and the torque fluctuation hardly appears in the detection value of the output torque. In the estimation principle, in the state where there is no variation in the current command value, the estimation value cos Δθ* of the cosine value of the angle detection error which is the angle error correlation value becomes 1, and correction of the current command value Iqref of q-axis based on the estimation value cos Δθ* of the cosine value of the angle detection error does not act.

Embodiment 2

Next, the motor controller 1 according to Embodiment 2 will be explained. The explanation for constituent parts the same as those in Embodiment 1 will be omitted. Although the basic configuration of the motor controller 1 and the motor 2 according to the present embodiment is the same as that of Embodiment 1, Embodiment 2 is different from Embodiment 1 in that processing of the angle error correction unit 56 is configured based on equation derivation in discrete system.

An equation (6) is obtained if the differential operation of the equation (2) of continuous system is discretized by backward difference. Herein, ΔT is a calculation cycle, and n indicates a value of n-th calculation cycle.

$$\frac{1-z^{-1}}{\Delta T} Iqreal(n) = \frac{1-z^{-1}}{\Delta T}(Iqref(n) \times \cos\Delta\theta(n)) = 0 \quad (6)$$

If the second part of the equation (6) is developed and rearranged, and the cosine value cos Δθ of the angle detection error is replaced to the estimation value cos Δθ*of the cosine value of the angle detection error, an equation (7) is obtained.

$$\cos\Delta\theta^*(n) = \frac{Iqref(n-1)}{Iqref(n)} \times \cos\Delta\theta^*(n-1) \qquad (7)$$

As shown in the equation (7) and the equation (8), since Iqref(n−1)/Iqref(n) becomes smaller than 1 when the current command value Iqref of q-axis increases, it is found that the estimation value cos Δθ*(n) of the cosine value of the angle detection error of this time calculation cycle may be decreased less than the estimation value cos Δθ*(n−1) of the cosine value of the angle detection error of the last time calculation cycle, and the absolute value of estimation value Δθ*of the angle detection error may be increased. On the other hand, since Iqref(n−1)/Iqref(n) becomes larger than 1 when the current command value Iqref of q-axis decreases, it is found that the estimation value cos Δθ*(n) of the cosine value of the angle detection error of this time calculation cycle may be increased more than the estimation value cos Δθ*(n−1) of the cosine value of the angle detection error of the last time calculation cycle, and the absolute value of estimation value Δθ*of the angle detection error may be decreased.

$$\begin{aligned}&1)\ Iqref(n) > Iqref(n-1) \qquad (8)\\ &\cos\Delta\theta^*(n) = \frac{Iqref(n-1)}{Iqref(n)} \times \cos\Delta\theta^*(n-1) < \cos\Delta\theta^*(n-1)\\ &2)\ Iqref(n) < Iqref(n-1)\\ &\cos\Delta\theta^*(n) = \frac{Iqref(n-1)}{Iqref(n)} \times \cos\Delta\theta^*(n-1) > \cos\Delta\theta^*(n-1)\end{aligned}$$

It is found from the equation (7) that the estimation value cos Δθ*of the cosine value of the angle detection error can be estimated based on only the current command value Iqref of q-axis, and state of the rotational speed and parameter of the motor 2 are unnecessary.

As similar to Embodiment 1, when the step change frequency of the angle detection value θdet is lower than the cutoff frequency of the feedback control system which controls the output torque of the motor 2, the angle error correction unit 56 estimates the cosine value cos Δθ*of the angle detection error based on the current command value Iqref of q-axis. The angle error correction unit 56 changes the estimation value cos Δθ*of the cosine value of the angle detection error so that the absolute value of the angle detection error Δθ increases with respect to increase in the current command value Iqref of q-axis, and the absolute value of the angle detection error Δθ decreases with respect to decrease in the current command value.

In the present embodiment, the angle error correction unit 56 calculates the estimation value cos Δθ*of the cosine value of the angle detection error, based on a ratio between the current command value Iqref(n−1) of q-axis of the last time calculation cycle and the current command value Iqref(n) of q-axis of this time calculation cycle.

Figure 10:
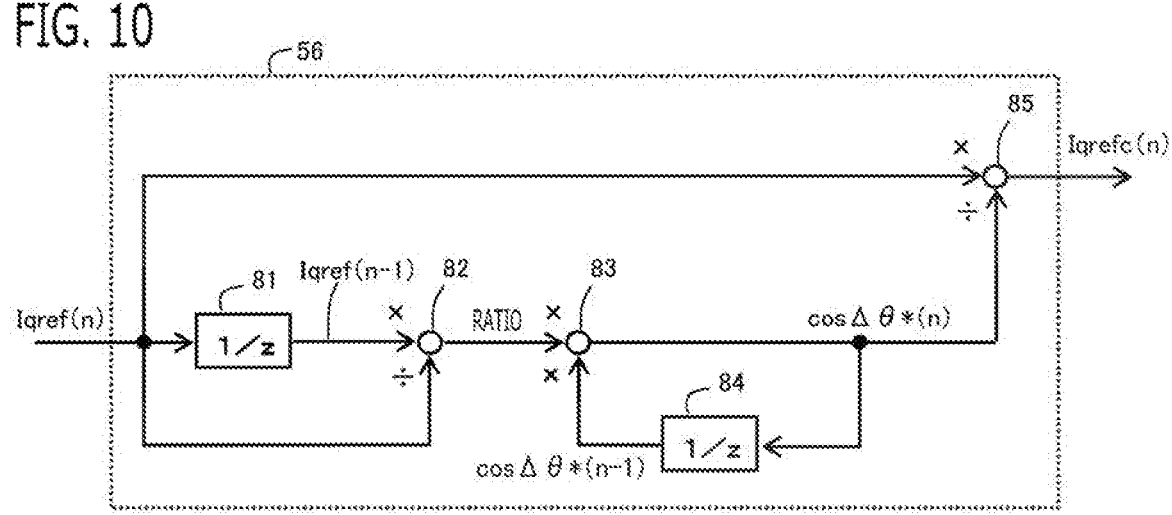
FIG. 10 is a block diagram of the angle error correction unit according to Embodiment 2 of the present disclosure.

In the present embodiment, as shown in FIG. 10 which expressed the equation (7) by block diagram, the angle error correction unit 56 calculates the current command value Iqref(n−1) of q-axis of the last time calculation cycle by a delay device 81 which delays the inputted current command value Iqref(n) of q-axis of this time calculation cycle by one calculation cycle and outputs it; and calculates the ratio by dividing the current command value Iqref (n−1) of q-axis of the last time calculation cycle by the current command value Iqref(n) of q-axis of this time calculation cycle by a divider 82. The angle error correction unit 56 calculates the estimation value cos Δθ*(n−1) of the cosine value of the angle detection error of the last time calculation cycle by a delay device 84 which delays the inputted estimation value cos Δθ*(n) of the cosine value of the angle detection error of this time calculation cycle by one calculation cycle and outputs it; and calculates a value obtained by multiplying the estimation value cos Δθ*(n−1) of the cosine value of the angle detection error of the last time calculation cycle to the ratio by a multiplier 83, as the estimation value cos Δθ*(n) of the cosine value of the angle detection error of this time calculation cycle.

Although the block diagram of FIG. 10 is designed based on the equation (7) which is derived by discretizing the differential operation by backward difference, it may be designed based on an equation which is derived by discretizing the differential operation by bilinear transform.

At the timing when the angle detection value θdet changed stepwise, the angle error correction unit 56 resets the current command value Iqref (n−1) of q-axis of the last time calculation cycle stored in the delay device 84 to an initial value (for example, 0.866), and outputs the initial value from the delay device 84.

As similar to Embodiment 1, the angle error correction unit 56 calculates a value obtained by dividing the current command value Iqref(n) of q-axis of this time calculation cycle by the estimation value cos Δθ*(n) of the cosine value of the angle detection error of this time calculation cycle by a divider 85, as the current command value Iqrefc(n) of q-axis after correction of this time calculation cycle. Then, the current control unit 55 performs the current feedback control based on the current command value Iqrefc of q-axis after correction.

Embodiment 3

Figure 11:
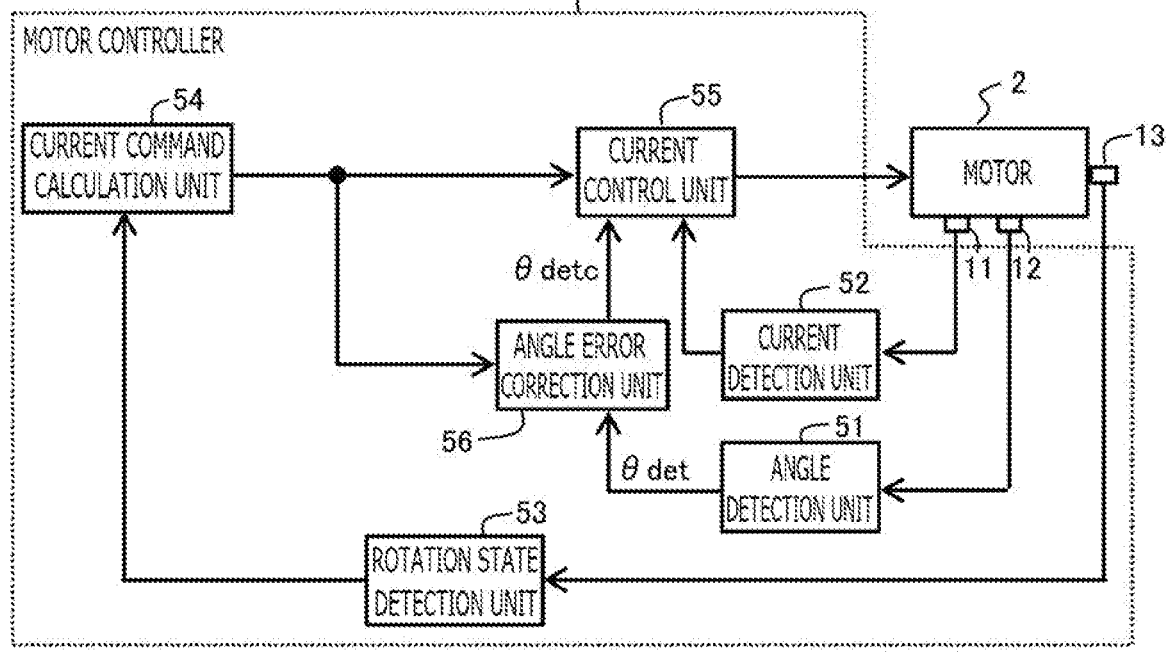
FIG. 11 is a schematic configuration diagram of the motor controller and the motor according to Embodiment 3 of the present disclosure.

Next, the motor controller 1 according to Embodiment 3 will be explained. The explanation for constituent parts the same as those in Embodiment 1 will be omitted. Although the basic configuration of the motor controller 1 and the motor 2 according to the present embodiment is the same as that of Embodiment 1, it is different from Embodiment 1 in that as shown in FIG. 11, the angle error correction unit 56 is configured to correct the angle detection value θdet based on the estimation value of the angle error correlation value, without correcting the current command value.

In the present embodiment, the angle error correction unit 56 calculates the estimation value Δθ*of the angle detection error based on the estimation value of the angle error correlation value, and corrects the angle detection value θdet by adding or subtracting the estimation value Δθ*of the angle detection error to the angle detection value θdet.

Specifically, as shown in an equation (9), the angle error correction unit 56 calculates an inverse cosine value of the estimation value cos Δθ*of the cosine value of the angle detection error, as the estimation value Δθ*of the angle detection error, and calculates a value obtained by adding or subtracting the estimation value Δθ*of the angle detection error to the angle detection value θdet, as the angle detection value θdetc after correction.

$$\pm\Delta\theta^* = \cos^{-1}(\cos\Delta\theta^*)$$

$$\theta detc = \theta det \pm \Delta\theta^* \qquad (9)$$

In the present embodiment, the angle detection error Δθ changes between −30 degrees and +30 degrees. However, a positive/negative information of the angle detection error Δθ does not appear in the cosine value of the angle detection error. As shown in FIG. 4, when the cosine value cos Δθ of the angle detection error increases, the angle detection error Δθ is a negative value, and when the cosine value cos Δθ of the angle detection error decreases, the angle detection error Δθ is a positive value. Accordingly, as shown in an equation (10), when the estimation value cos Δθ* of the cosine value of the angle detection error increases, the angle error correction unit 56 calculates the estimation value Δθ* of the angle detection error of a negative value, and calculates a value obtained by subtracting the estimation value Δθ* of the angle detection error from the angle detection value θdet, as the angle detection value θdetc after correction. On the other hand, when the estimation value cos Δθ* of the cosine value of the angle detection error decreases, the angle error correction unit 56 calculates the estimation value Δθ* of the angle detection error of a positive value, and calculates a value obtained by adding the estimation value Δθ* of the angle detection error to the angle detection value θdet, as the angle detection value θdetc after correction.

$$1)\ \frac{d}{dt}\cos\Delta\theta^* > 0 \qquad (10)$$

$$-\Delta\theta^* = \cos^{-1}(\cos\Delta\theta^*)$$

$$\theta\text{det}c = \theta\text{det} - \Delta\theta^*$$

$$2)\ \frac{d}{dt}\cos\Delta\theta^* < 0$$

$$+\Delta\theta^* = \cos^{-1}(\cos\Delta\theta^*)$$

$$\theta\text{det}c = \theta\text{det} + \Delta\theta^*$$

Figure 12:
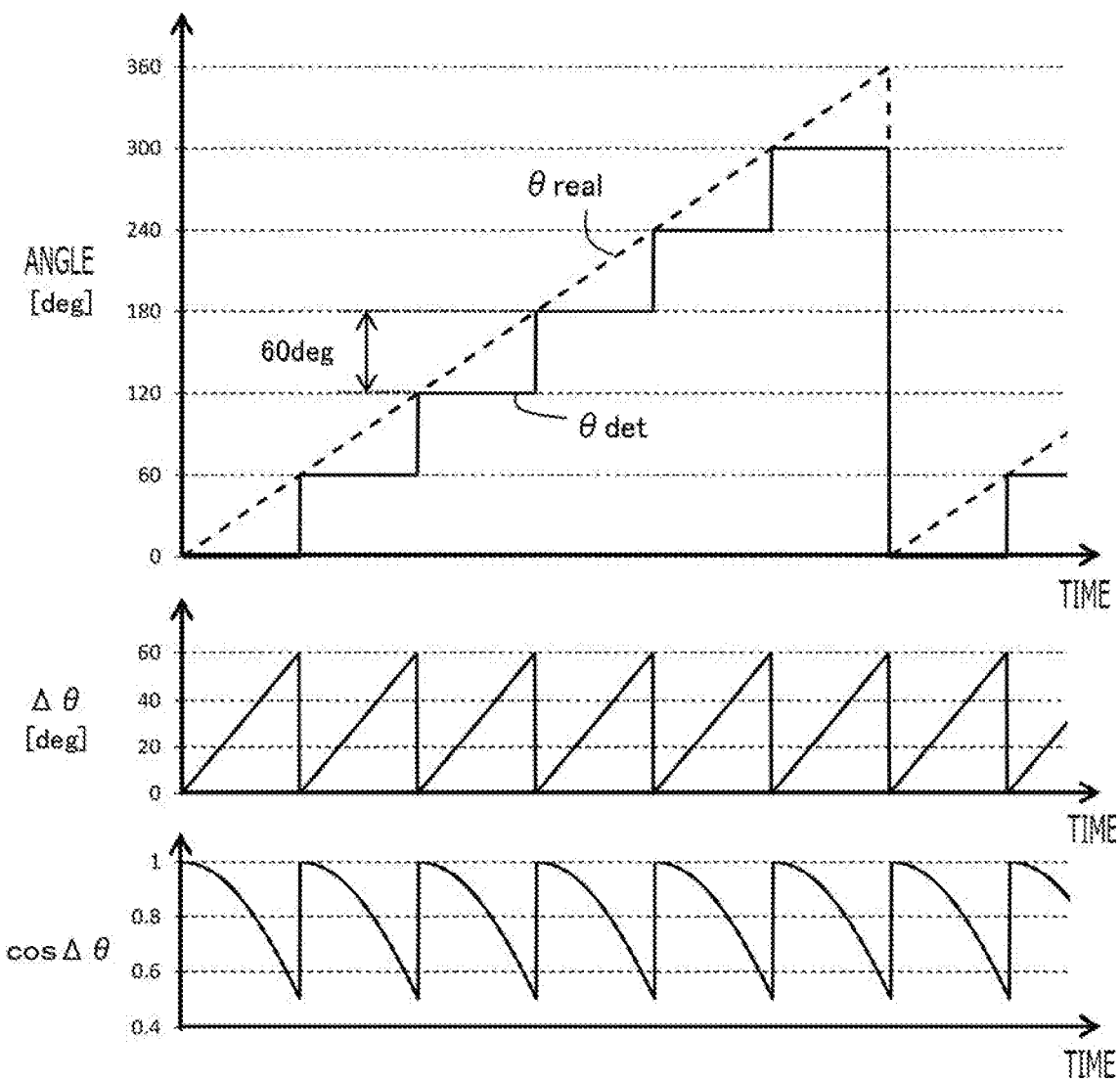
FIG. 12 is a time chart showing a behavior of another example of the angle detection error and the cosine value of the angle detection error according to Embodiment 3 of the present disclosure.

Alternatively, as shown in FIG. 12, offsetting the angle detection value θdet by −30 degrees compared with the case of FIG. 4 so that the angle detection error Δθ changes with a positive value between 0 degree and +60 degrees, the angle error correction unit 56 may always calculate the estimation value Δθ* of the angle detection error of a positive value, and may calculate a value obtained by adding the estimation value Δθ* of the angle detection error to the angle detection value θdet, as the angle detection value θdetc after correction.

In this case, when the angle detection error Δθ changes stepwise, the angle detection error Δθ becomes 0; and the angle error correction unit 56 resets the estimation value cos Δθ* of the cosine value of the angle detection error to 1 at the timing when the angle detection value θdet changed stepwise.

Then, the current control unit 55 performs the current feedback control based on the angle detection value θdetc after correction. Specifically, the current coordinate conversion unit 64 performs three-phase/two-phase conversion and rotating coordinate conversion based on the angle detection value θdetc after correction; and the voltage coordinate conversion unit 62 performs fixed coordinate conversion and two-phase/three-phase conversion based on the angle detection value θdetc after correction.

Embodiment 4

Next, the motor controller 1 according to Embodiment 4 will be explained. The explanation for constituent parts the same as those in Embodiment 1 will be omitted. Although the basic configuration of the motor controller 1 and the motor 2 according to the present embodiment is the same as that of Embodiment 1, it is different from Embodiment 1 in that the angle error correction unit 56 corrects the current command value or the angle detection value θdet based on a value obtained by multiplying an adjustment gain to the angle error correlation value.

As explained in Embodiments 1 and 2, the current command value Iqref of q-axis is corrected by dividing the current command value Iqref of q-axis by the estimation value cos Δθ* of the cosine value of the angle detection error. First, a reduction rate of the torque fluctuation by this method of correcting the current command value Iqref of q-axis is derived theoretically.

In the present embodiment, as shown in FIG. 12, it is considered that the angle detection value θdet is offset by −30 degrees, and the angle detection error Δθ becomes 0 at time when the angle detection value θdet changes stepwise. At time when the angle detection value θdet changes stepwise, the actual current Iqreal of q-axis coincides with the current command value Iqref of q-axis. Accordingly, if the actual current of q-axis at time when the angle detection value θdet changed stepwise is set to Iqreal0, a relationship between the current command value Iqref of q-axis and the actual current Iqreal of q-axis 0 at the step change time can be expressed by an equation (11), and the estimation value cos Δθ* of the cosine value of the angle detection error can be estimated by an equation (12).

$$Iqref \times \cos\Delta\theta^* = Iqreal0 \qquad (11)$$

$$\cos\Delta\theta^* = \frac{Iqreal0}{Iqref} \qquad (12)$$

As shown in an equation (13), the current command value Iqrefc of q-axis after correction is calculated by multiplying the current command value Iqref of q-axis to the reciprocal of the estimation value cos Δθ* of the cosine value of the angle detection error.

$$Iqrefc = Iqref \times \frac{1}{\cos\Delta\theta^*} \qquad (13)$$

If the current command value Iqref of q-axis is eliminated and rearranged from the equation (12) and the equation (13), the estimation value cos Δθ* of the cosine value of the angle detection error can be expressed by an equation (14).

$$\cos\Delta\theta^* = \frac{Iqreal0}{Iqrefc} \times \frac{1}{\cos\Delta\theta^*} \qquad (14)$$

$$\therefore \cos\Delta\theta^* = \sqrt{\frac{Iqreal0}{Iqrefc}}$$

The actual current Iqreal of q-axis can be expressed by an equation (15) using the cosine value cos Δθ of the actual angle detection error, and it becomes as an equation (16) at the time when the angle detection value θdet changed stepwise.

$$Iqreal = Iqrefc \times \cos \Delta\theta \qquad (15)$$

$$Iqreal0 = Iqrefc \times \cos \Delta\theta \qquad (16)$$

From the equation (16), the cosine value cos Δθ of the angle detection error can be expressed by an equation (17).

$$\cos\Delta\theta = \frac{Iqreal0}{Iqref} \quad (17)$$

From the equation (14) and the equation (17), the estimation value cos Δθ* of the cosine value of the angle detection error and the cosine value cos Δθ of the actual angle detection error becomes a relationship of an equation (18). In an example below, equations (13) and (18) are used to find equation (19). Finally, further below, for an example maximum actual angle detection error of 60 degrees, a reduction rate is found, see equation (24).

$$\cos\Delta\theta^* = \sqrt{\cos\Delta\theta} \quad (18)$$

Accordingly, from the equation (13) and the equation (18), the current command value Iqrefc of q-axis after correction can be expressed by an equation (19) using the cosine value cos Δθ of the actual angle detection error.

$$Iqrefc = \frac{Iqref}{\sqrt{\cos\Delta\theta}} \quad (19)$$

Next, a reduction rate of the torque fluctuation by the angle error correction unit 56 is derived. First, the case where the current command value Iqref of q-axis is not corrected by the angle error correction unit 56 is considered. At the time when the angle detection value θdet changed stepwise, the angle detection error Δθ becomes 0, and the actual current Iqreal of q-axis and the current command value Iqref of q-axis coincide. On the other hand, in the condition where the angle detection error Δθ becomes a maximum value Δθ max, the actual current Iqreal of q-axis and the current command value Iqref of q-axis are expressed by a relationship of an equation (20).

$$Iqreal = Iqrefc \times \cos\Delta\theta\max \quad (20)$$

Therefore, if the current command value Iqref of q-axis is not corrected, a variation ΔIqreal of the actual current of q-axis which occurs from the time when the angle detection value θdet changed stepwise to the time when the angle detection error Δθ becomes the maximum can be expressed by an equation (21). The variation of the current of q-axis is generally proportional to the torque fluctuation.

$$\Delta Iqreal = Iqref - Iqref \times \cos\Delta\theta\max = Iqref \times (1 - \cos\Delta\theta\max) \quad (21)$$

Next, the case where the current command value Iqref of q-axis is corrected using the equation (13) is considered. At the time when the angle detection value θdet changed stepwise, similar to the case where the current command value Iqref of q-axis is not corrected, the actual current Iqreal of q-axis and the current command value Iqref of q-axis coincide. On the other hand, in the condition where the angle detection error Δθ becomes the maximum value Δθ max, a relationship between the actual current Iqreal of q-axis and the current command value Iqref of q-axis becomes as an equation (22), if the equation (19) is used.

$$Iqreal = Iqrefc \times \cos\Delta\theta\max = \frac{Iqref}{\sqrt{\cos\Delta\theta\max}} \times \cos\Delta\theta\max = Iqref \times \sqrt{\cos\Delta\theta\max} \quad (22)$$

Therefore, in the case where the current command value Iqref of q-axis is corrected, the variation ΔIqreal of the actual current of q-axis becomes as an equation (23).

$$\Delta Iqreal = Iqref - Iqref \times \sqrt{\cos\Delta\theta\max} = Iqref \times (1 - \cos\Delta\theta\max) \quad (23)$$

Accordingly, from the equation (21) and the equation (23), a reduction rate RIq of the variation ΔIqreal of the actual current of q-axis in the case of with correction with respect to the case of without correction of the current command value Iqref of q-axis becomes as an equation (24); and the reduction rate RIq of variation of the current of q-axis corresponds to a reduction rate of the torque fluctuation.

$$RIq = \frac{1 - \sqrt{\cos\Delta\theta\max}}{1 - \cos\Delta\theta\max} \quad (24)$$

In the present embodiment, the maximum value Δθ max of the angle detection error is 60 degrees, and the reduction rate RIq of variation of the current of q-axis becomes 58.6% from the equation (24). Therefore, there is a limit in reduction of the torque fluctuation by correction of the current command value Iqref of q-axis using the equation (13).

In order to further improve the reduction rate of the torque fluctuation, it is necessary to increase the correction amount of the current command value Iqref of q-axis. On the other hand, at the time when the angle detection value θdet changed stepwise, since the angle detection error Δθ becomes 0, and the actual current Iqreal of q-axis and the current command value Iqref of q-axis coincide, it is necessary to set a correction coefficient α which is multiplied to the current command value Iqref of q-axis, to 1.

Then, in order to satisfy these conditions, in the present embodiment, as shown in an equation (25), the angle error correction unit 56 calculates a value obtained by subtracting 1 from the reciprocal of the estimation value cos Δθ* of the cosine value of the angle detection error, calculates a value obtained by multiplying the adjustment gain K to this calculated value, and calculates a value obtained by adding 1 to this calculated value as, the correction coefficient α. Then, as shown in an equation (26), the angle error correction unit 56 calculates the current command value Iqrefc of q-axis after correction by multiplying the correction coefficient α to the current command value Iqref of q-axis.

$$\alpha = K \times \left(\frac{1}{\cos\Delta\theta^*} - 1\right) + 1 \quad (25)$$

$$Iqrefc = \alpha \times Iqref \quad (26)$$

In the equation (25), K is the adjustment gain; and in the case of K=1, it is equal to correction of the equation (5) explained in Embodiment 1. Since without depending on a value of K, the correction coefficient α becomes 1 in the case of the angle detection error Δθ=0, it is found that required conditions are satisfied.

By referring to a table data in which a relationship between the cosine value cos Δθ of the angle detection error and the correction coefficient α is preliminarily set considering the adjustment gain K, the angle error correction unit 56 may calculate the correction coefficient α corresponding to the estimation value cos Δθ* of the cosine value of the angle detection error, and may calculate the current command value Iqrefc of q-axis after correction by multiplying the correction coefficient α to the current command value Iqref of q-axis.

Figure 13:
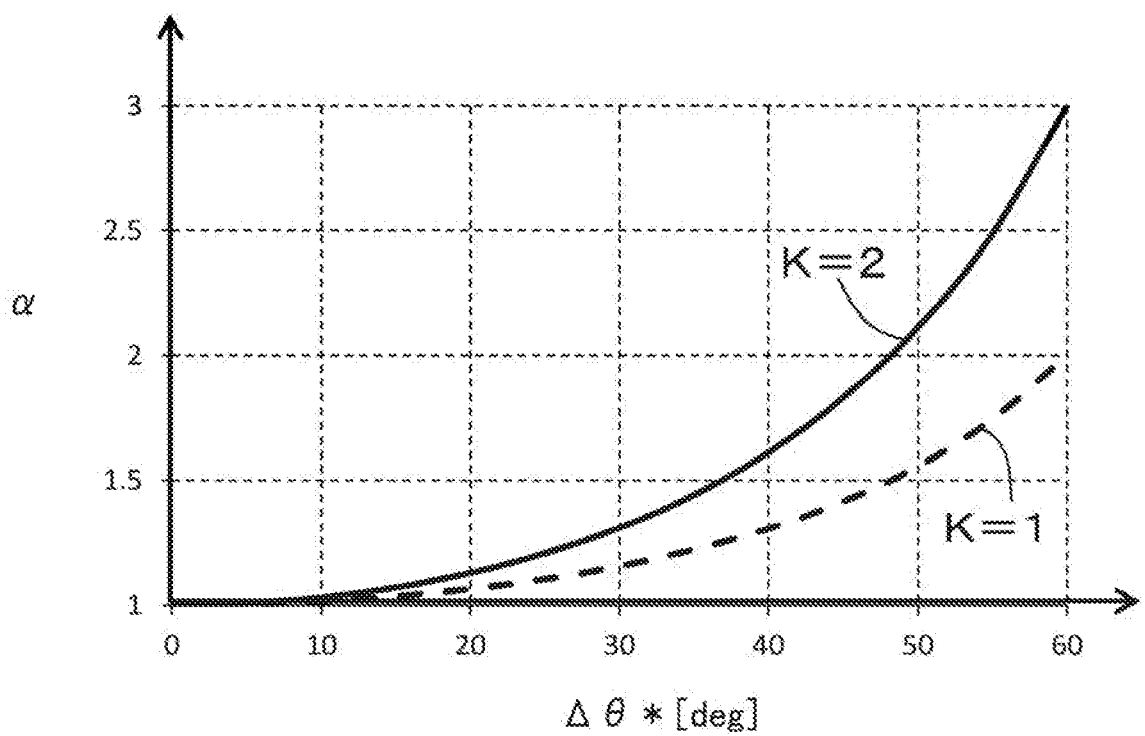
FIG. 13 is a figure explaining change of the correction coefficient with respect to change of the adjustment gain according to Embodiment 4 of the present disclosure.

FIG. 13 shows the correction coefficient α with respect to the estimation value Δθ* of the angle detection error which changes from 0 degree to +60 degrees. Although the maximum value of the correction coefficient α is 2 at the adjustment gain K=1, the maximum value of the correction coefficient α can be increased to 3 by setting the adjustment gain K=2.

Next, the reduction rate of the torque fluctuation with respect to the adjustment gain K will be derived. In the equation (14), if a correction coefficient 1/cos Δθ* is replaced to the equation (25), it becomes an equation (27). Further, if the equation (27) is solved for the cos Δθ*, it becomes an equation (28).

$$\cos\Delta\theta^* = \frac{Iqreal0}{Iqref} \times \alpha = \frac{Iqreal0}{Iqref} \times \left\{ K \times \left( \frac{1}{\cos\Delta\theta^*} - 1 \right) + 1 \right\} \quad (27)$$

$$\cos\Delta\theta^* = \frac{1}{2} \left\{ -(K-1) \times \frac{Iqreal0}{Iqref} + \sqrt{(K-1)^2 \left( \frac{Iqreal0}{Iqref} \right)^2 + 4 \frac{Iqreal0}{Iqref} K} \right\} \quad (28)$$

Herein, if the relationship of the equation (17) is used, the equation (28) can be expressed by an equation (29).

$$\cos\Delta\theta^* = \frac{1}{2} \left\{ -(K-1) \times \cos\Delta\theta + \sqrt{(K-1)^2 (\cos\Delta\theta)^2 + 4K\cos\Delta\theta} \right\} \quad (29)$$

Therefore, the current command value Iqref of q-axis corrected using the equation (25) becomes an equation (30).

$$Iqreal0 = \quad (30)$$

$$Iqref \times \left\{ K \times \left( \frac{1}{\frac{1}{2}\{-(K-1)\cos\Delta\theta + \sqrt{(K-1)^2(\cos\Delta\theta)^2 + 4K\cos\Delta\theta}\}} - 1 \right) + 1 \right\} \times \cos\Delta\theta$$

Next, the reduction rate of the torque fluctuation in the case of using the correction coefficient α of the equation (25) will be calculated. From the equation (30), at the time when the angle detection value θdet changed stepwise, the actual current Iqreal of q-axis and the current command value Iqref of q-axis coincide. On the other hand, in the case where the angle detection error Δθ becomes the maximum value Δθ max, a relationship between the actual current Iqreal of q-axis and the current command value Iqref of q-axis becomes as an equation (31).

$$Iqreal = Iqref \times \quad (31)$$

$$\left\{ K \times \left( \frac{1}{\frac{1}{2}\{-(K-1)\cos\Delta\theta\max + \sqrt{(K-1)^2(\cos\Delta\theta\max)^2 + 4K\cos\Delta\theta\max}\}} - 1 \right) + 1 \right\} \times \cos\Delta\theta\max$$

Accordingly, the reduction rate RIq (the reduction rate of torque fluctuation) of variation of the current of q-axis after correction by the equation (25) and the equation (26) can be calculated by an equation (32) from the equation (21) and the equation (31).

$$RIq = \frac{1 - \left\{ K \times \left( \frac{1}{\frac{1}{2}\{-(K-1)\cos\Delta\theta\max + \sqrt{(K-1)^2(\cos\Delta\theta\max)^2 + 4K\cos\Delta\theta\max}\}} - 1 \right) + 1 \right\} \times \cos\Delta\theta\max}{1 - \cos\Delta\theta\max} \quad (32)$$

Figure 14:
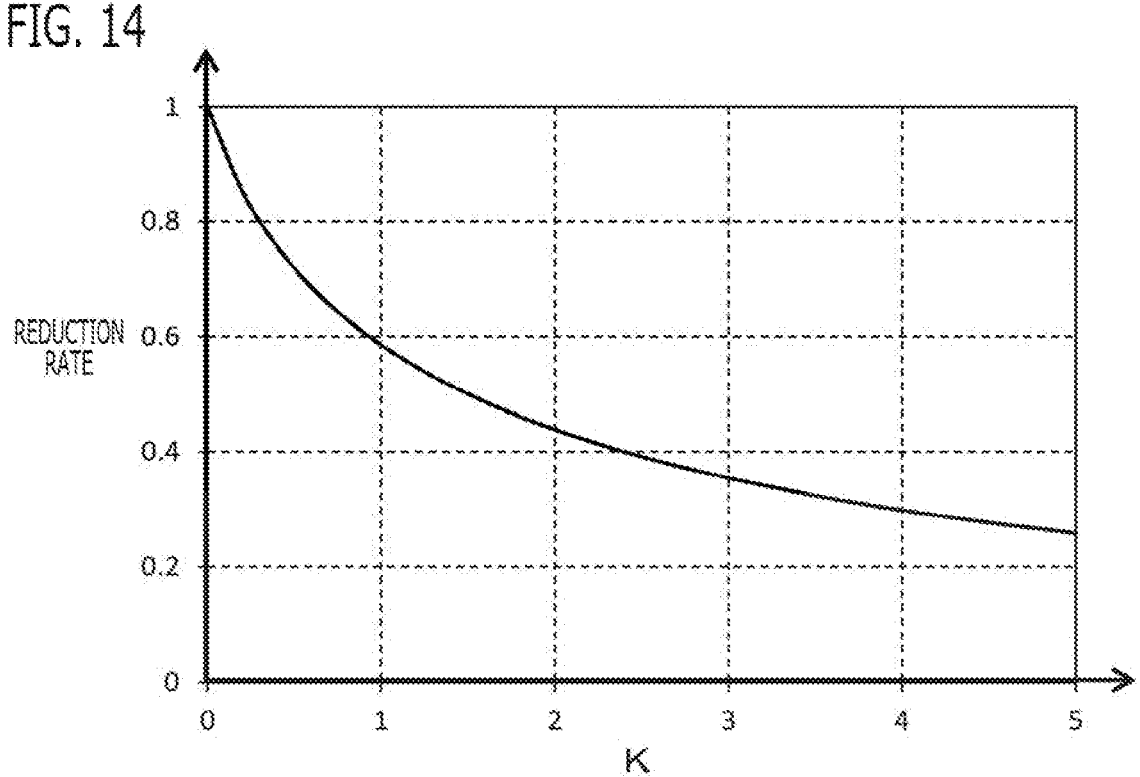
FIG. 14 is a figure explaining change of the reduction rate of the torque fluctuation with respect to change of the adjustment gain according to Embodiment 4 of the present disclosure.

FIG. 14 shows the reduction rate of the torque fluctuation with respect to the adjustment gain K calculated using the equation (32) in the case of Δθ max=60 degrees. From the calculation result, the reduction rate of the torque fluctuation improves as the adjustment gain K increases; as compared with K=0 which does not correct, it is found that the torque fluctuation can be suppressed to 43.8% at K=1, to 58.6% at K=2.

FIG. 15 shows a time chart in the case of the adjustment gain K=2. Compared with the torque fluctuation of FIG. 8 corresponding to the adjustment gain K=1, the torque fluctuation can further be suppressed by using the adjustment gain K=2; and the efficiency of the correction method which introduced the adjustment gain K can be confirmed. Even in the case where the angle detection error Δθ becomes −30 degrees at the time when the angle detection value θdet changed stepwise as in the case of FIG. 15, the reduction rate of the torque fluctuation can be improved by multiplication of the adjustment gain K according to the present embodiment.

As Embodiment 3, the angle error correction unit 56 may calculate the inverse cosine value of the estimation value cos Δθ* of the cosine value of the angle detection error, calculate a value obtained by multiplying the adjustment gain K to the inverse cosine value, and calculate a value obtained by adding or subtracting this calculated value to the angle detection value θdet, as the angle detection value θdetc after correction. Even with this configuration, the reduction rate of the torque fluctuation can be improved.

As described above, since the angle error correction unit 56 is configured to correct the current command value or the angle detection value θdet based on a value obtained by multiplying the adjustment gain K to the angle error correlation value, the correction amount of the current command value to the angle error correlation value can be increased appropriately, and the suppression effect of the torque fluctuation resulting from the angle detection error can be improved.

Embodiment 5

Next, the motor controller 1 according to Embodiment 5 will be explained. The explanation for constituent parts the same as those in Embodiment 4 will be omitted. Although the basic configuration of the motor controller 1 and the motor 2 according to the present embodiment is the same as that of Embodiment 4, it is different from Embodiment 4 in that the angle error correction unit 56 changes the adjustment gain K so that the correction amount of the current command value or the angle detection value decreases as the rotational speed of the rotor increases.

By the way, the torque fluctuation which transmits the rotary shaft of the rotor decreases by the frequency characteristic of the rotary shaft of the rotor, as the rotational speed increases. This is because, as the rotational speed increases, the frequency of the torque fluctuation resulting from the angle detection error increases, the torque fluctuation attenuates in the rotary shaft of the rotor and hardly transmit to a fixing position of the torque sensor 13. Therefore, regardless of presence or absence of correction of the current command value, as the rotational speed increases, the torque fluctuation which transmits the rotary shaft of the rotor decreases, and therefore the necessity of reducing the torque fluctuation decreases.

On the other hand, since the correction of the current command value by the angle error correction unit 56 corresponds to the increase of the current command value according to the angle detection error, if the adjustment gain K is enhanced too much, the noise component included in the torque detection value is amplified, and noise and vibration are easily generated. Therefore, by decreasing the adjustment gain K as the rotational speed increases, generation of noise and vibration can be suppressed in a rotational speed region where the necessity of reducing the torque fluctuation is low.

Figure 16:
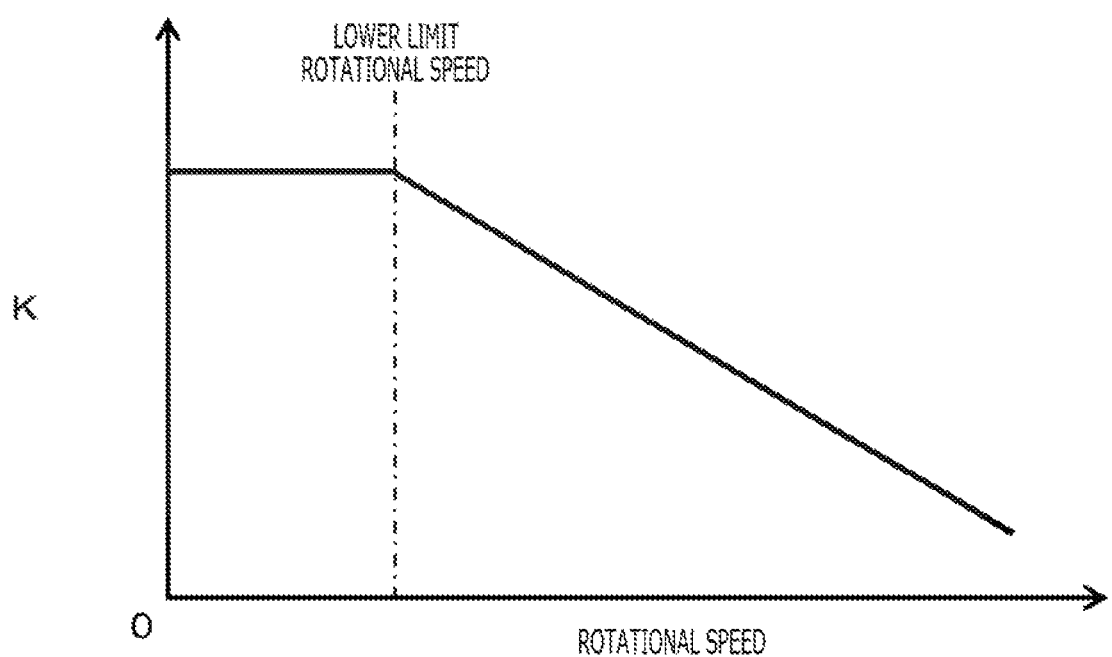
FIG. 16 is a figure explaining setting of the adjustment gain according to the rotational speed according to Embodiment 5 of the present disclosure.

Therefore, in the present embodiment, as shown in FIG. 16, the angle error correction unit 56 decreases the adjustment gain K as the rotational speed of the rotor increases. For example, by referring to a table data or a function in which a relationship between the rotational speed of the rotor and the adjustment gain K is preliminarily set, the angle error correction unit 56 calculates the adjustment gain K corresponding to the present rotational speed of the rotor.

The period in which the angle detection value θdet changes stepwise increases, as the rotational speed decreases. Since a calculated value of the rotational speed is not updated during a period in which the angle detection value θdet is not changing, an error between the actual rotational speed and the calculated values of the rotational speed increases as the rotational speed decreases. On the other hand, in a condition where the actual rotational speed is low, since an attenuation effect of the torque fluctuation in the rotary shaft of the rotor is not sufficient, it is necessary to set the adjustment gain K to a high value.

Then, when the rotational speed is lower than a preliminarily set lower limit rotational speed, the angle error correction unit 56 sets the adjustment gain K to a constant value so that the adjustment gain K does not increase too much. By setting the adjustment gain K to a constant value, even in the low rotational speed state where the error of the calculated value of the rotational speed increases, the error of the calculated value of the rotational speed can be suppressed from affecting setting of the adjustment gain K.

As Embodiment 3, the angle error correction unit 56 may calculate the inverse cosine value of the estimation value cos Δθ* of the cosine value of the angle detection error, calculate a value obtained by multiplying the adjustment gain K to the inverse cosine value, and calculate a value obtained by adding or subtracting this calculated value to the angle detection value θdet, as the angle detection value θdetc after correction. In this case, the angle error correction unit 56 may decrease the adjustment gain K as the rotational speed of the rotor increases.

Therefore, at comparatively low rotational speed at which the necessity of decreasing the torque fluctuation is high, the correction amount of the current command value or the angle detection value is enlarged to improve the suppression effect of the torque fluctuation; and at comparatively high rotational speed at which the necessity of decreasing the torque fluctuation is low, the correction amount of the current command value or the angle detection value is reduced to suppress the generation of noise and vibration by correction.

Embodiment 6

Next, the motor controller 1 according to Embodiment 6 will be explained. The explanation for constituent parts the same as those in Embodiment 1 will be omitted. Although the basic configuration of the motor controller 1 and the motor 2 according to the present embodiment is the same as that of Embodiment 1, it is different from Embodiment 1 in that the rotation state detection unit 53 detects the rotational speed of the motor 2 as the rotation state, and the current command calculation unit 54 calculates the current command value based on the detection value of the rotational speed.

There is an application required to make the rotational speed of the motor 2 closer to a target rotational speed. In the present embodiment, the current command calculation unit 54 performs feedback control that changes the current command value so that the detection value of the rotational speed approaches a target rotational speed. Various kinds of feedback control, such as PID control, is used. The current command calculation unit 54 calculates at least the current command value Iqref of q-axis as the current command value.

Embodiment 7

Figure 17:
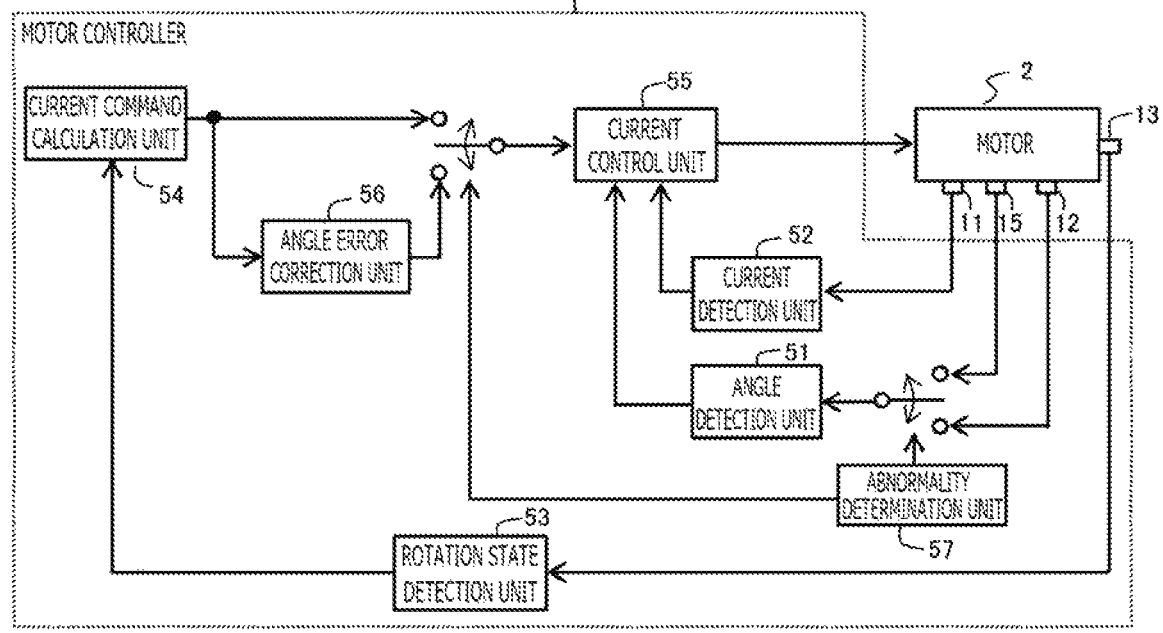
FIG. 17 is a schematic configuration diagram of the motor controller and the motor according to Embodiment 7 of the present disclosure.

Next, the motor controller 1 according to Embodiment 7 will be explained. The explanation for constituent parts the same as those in Embodiment 1 will be omitted. Although the basic configuration of the motor controller 1 and the motor 2 according to the present embodiment is the same as that of Embodiment 1, an angle sensor 15 of main system whose angle detection resolution is higher than the angle sensor 12 is provided in addition to the angle sensor 12 similar to Embodiment 1, and accordingly, each part of the motor controller 1 is different from Embodiment 1. FIG. 17 shows a schematic configuration diagram of the motor controller 1 and the motor 2 according to the present embodiment.

The angle sensor 15 of main system is an angle sensor with high resolution whose angle detection interval is narrower than the angle sensor 12. For example, a resolver is used as the angle sensor 15 of main system.

The motor controller 1 is provided with an abnormality determination unit 57 that determines abnormal or normal of the angle sensor 15 of main system and the angle sensor 12. The abnormality determination unit 57 determines abnormal or normal of each angle sensor based on the output signal of each angle sensor.

When the abnormality determination unit 57 determines that the angle sensor 15 of main system is normal, the angle detection unit 51 detects the angle θdet and the rotational speed based on the output signal of the angle sensor 15 of main system; and when the abnormality determination unit 57 determines that the angle sensor 15 of main system is abnormal, the angle detection unit 51 detects the angle θdet and the rotational speed based on the output signal of the angle sensor 12. Therefore, when the angle sensor 15 of main system is normal, the current control unit 55 controls the current based on the angle detection value θdet detected by the angle sensor 15 of main system. On the other hand, when the angle sensor 15 of main system is abnormal, the current control unit 55 controls the current based on the angle detection value θdet detected by the angle sensor 12.

Since the angle detection resolution of the angle sensor 15 of main system is high, when using the angle sensor 15 of main system, the angle detection error is small; and accordingly, unlike Embodiment 1, it is configured that the angle error correction unit 56 does not correct the current command value or the angle detection value. That is to say, when the abnormality determination unit 57 determines that the angle sensor 15 of main system is normal, without performing processing of the angle error correction unit 56, the current control unit 55 controls the current based on the current command value or the angle detection value θdet which is not corrected. On the other hand, when the abnormality determination unit 57 determines that the angle sensor 15 of main system is abnormal, as similar to Embodiment 1, processing of the angle error correction unit 56 is performed, and the current control unit 55 controls the current based on the current command value or the angle detection value after correction.

Embodiment 8

Figure 18:
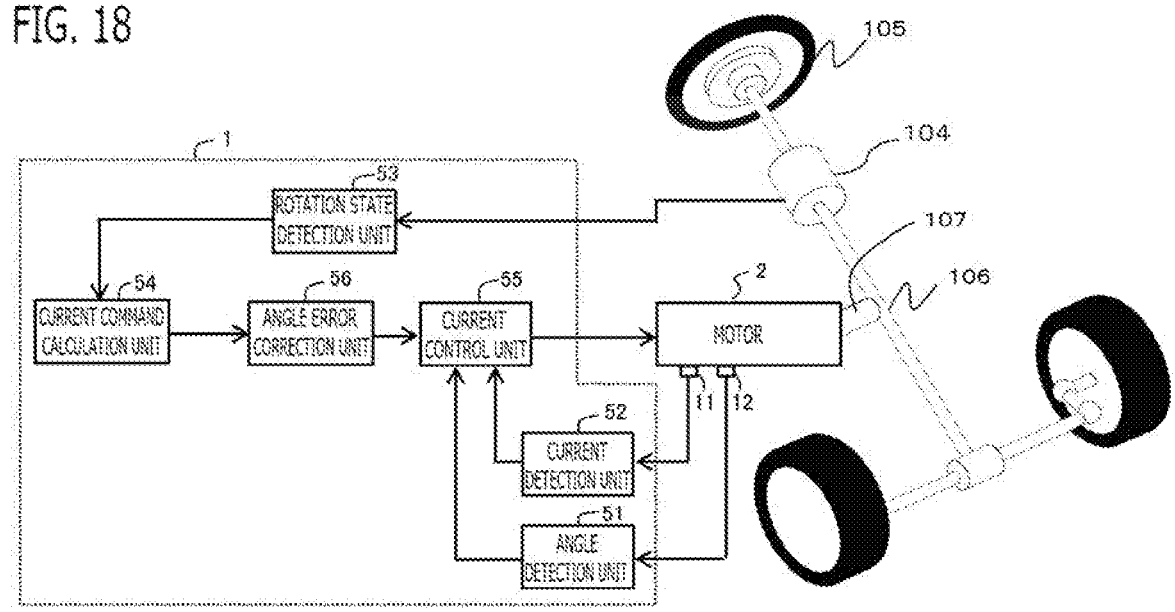
FIG. 18 is a schematic configuration diagram of the electric power steering apparatus using the motor controller and the motor according to Embodiment 8 of the present disclosure.

Next, the motor controller 1 according to Embodiment 8 will be explained. The explanation for constituent parts the same as those in Embodiment 1 will be omitted. Although the basic configuration of the motor controller 1 and the motor 2 according to the present embodiment is the same as that of Embodiment 1, it is different from Embodiment 1 in that as shown in FIG. 18, the motor controller 1 and the motor 2 are used for an electric power steering apparatus.

The electric power steering apparatus is provided with the motor 2, the motor controller 1 which controls the motor 2, and a driving force transmission mechanism 107 which transmits a driving force of the motor 2 to a steering device of a vehicle. In the present embodiment, the electric power steering apparatus is provide with a steering wheel 105 which a driver operates, a steering shaft 106 which transmits handle operation of the driver to wheels, a steering torque sensor 104 which is attached to the steering shaft 106 and detects a steering wheel torque of the driver, and the driving force transmission mechanism 107, such as a worm gear mechanism, which transmits the driving torque of the motor 2 to the steering shaft 106.

In the present embodiment, the rotation state detection unit 53 detects the steering wheel torque of the driver as the rotation state, based on an output signal of the steering torque sensor 104. The current command calculation unit 54 calculates the current command value, based on the detection value of the steering wheel torque of the driver as the rotation state. The current command calculation unit 54 calculates the current command value Iqref of q-axis which is proportional to the detection value of the steering wheel torque so as to assist the steering wheel torque of the driver by the output torque of the motor 2.

In the electric power steering apparatus, when the output torque of the motor 2 decreases according to the angle detection error, the steering wheel torque of the driver increases, and the detection value of the steering wheel torque increases. In this case, since the current command calculation unit 54 makes the current command value Iqref of q-axis increase so as to compensate drop of the output torque, the cosine value of the angle detection error can be estimated by the principle explained in Embodiment 1.

In the electric power steering apparatus, since the torque fluctuation generated in the motor 2 is transmitted to the driver via the steering wheel 105, it is required that the torque fluctuation is small. However, in order to reduce cost of the electric power steering apparatus, an inexpensive angle sensor 12 with low angle detection resolution, such as a Hall sensor, may be used, and the torque fluctuation resulting from the angle detection error occurs in this case. Then, as explained in Embodiment 1, by correcting the current command value or the angle detection value by the angle error correction unit 56, the torque fluctuation resulting from the angle detection error can be suppressed, and the standard of torque fluctuation required for the electric power steering can be fulfilled.

Figure 19:
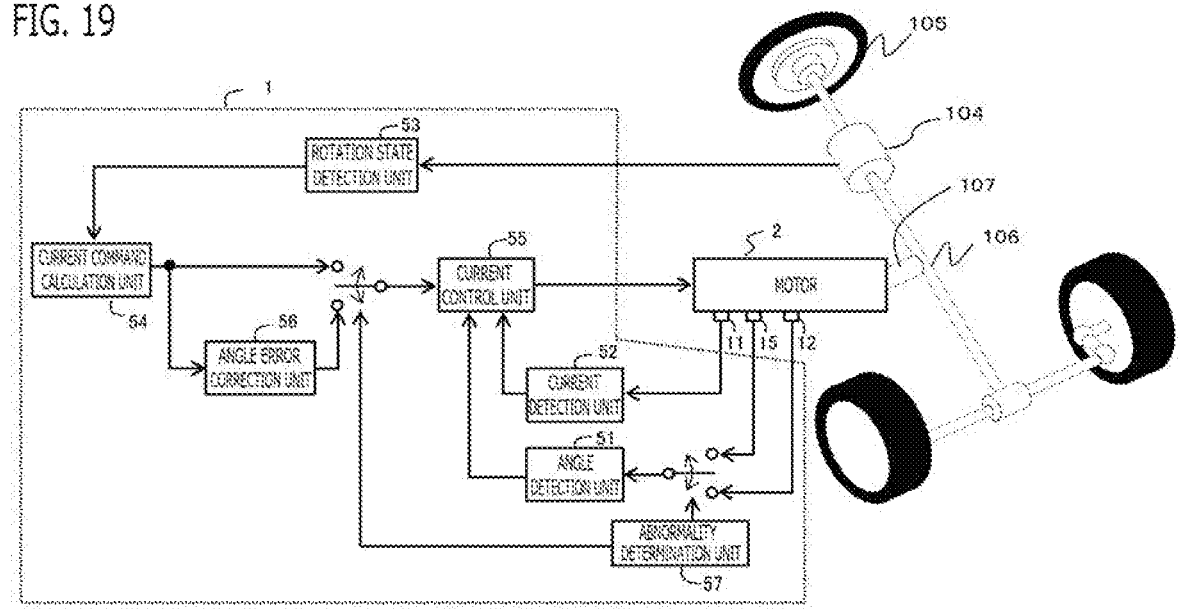
FIG. 19 is a schematic configuration diagram of another example of the electric power steering apparatus using the motor controller and the motor according to Embodiment 8 of the present disclosure.

Alternatively, as shown in FIG. 19, the motor controller 1 and the motor 2 which were explained in Embodiment 7 may be used for the electric power steering apparatus. That is to say, in addition to the angle sensor 12 similar to Embodiment 1, the angle sensor 15 of main system with higher angle detection resolution than the angle sensor 12 is provided, and accordingly, each part of the motor controller 1 is configured similarly to Embodiment 7. Also in this case, configuration of the electric power steering apparatus is the same as the above configuration, and the current command calculation unit 54 calculates the current command value, based on the detection value of the steering wheel torque of the driver as the rotation state.

Various modifications and alterations of this disclosure will be apparent to those skilled in the art without departing from the scope and spirit of this disclosure, and it should be understood that this is not limited to the illustrative embodiments set forth herein.

REFERENCE SIGNS LIST

1 Motor controller, 10 Inverter, 2 Motor, 51 Angle detection Unit, 52 Current detection unit, 53 Rotation state detection unit, 54 Current command calculation unit, 55 Current control unit, 56 Angle error correction unit, K Adjustment gain, θdet Angle detection value, Δθ Angle detection error, Δθ*Estimation value of angle detection error, cos Δθ*Estimation value of cosine value of angle detection error

What is claimed is:

1. A motor controller comprising:
   an angle detector that changes an angle detection value stepwise to a corresponding angle whenever an angle of a rotor of a motor having multi-phase windings reach each of a plurality of preliminarily set angles;
   a current detector that detects a current flowing through the multi-phase windings;
   a rotation state detector that detects a rotation state of the motor;
   a current command calculator that calculates a current command value to control the current flowing through the multi-phase windings based on a detection value of the rotation state;
   a current controller that controls the current flowing through the multi-phase windings based on the angle detection value, a current detection value, and the current command value; and
   an angle error corrector that, when a change frequency which is a reciprocal of a change period in which the angle detection value changes stepwise is lower than a cutoff frequency of a feedback control system which controls the rotation state, estimates an angle error correlation value which correlates with an angle detection error which is an error of the angle detection value with respect to an actual angle, based on the current command value, and corrects the current command value or the angle detection value based on an estimation value of the angle error correlation value, wherein the angle error corrector changes the estimation value of the angle error correlation value so that an absolute value of the angle detection error increases with respect to increase in the current command value, and the absolute value of the angle detection error decreases with respect to decrease in the current command value.

2. The motor controller according to claim 1, wherein the current controller controls the current which flows into the multi-phase windings on a dq-axis rotating coordinate system, which consists of a d-axis defined in a magnetic pole position of the rotor and a q-axis defined in a direction advanced to the d-axis by 90 degrees in an electrical angle and rotates according to the angle detection value, wherein the current command calculator calculates at least a current command value of the q-axis as the current command value, and wherein the angle error corrector estimates the angle error correlation value based on the current command value of the q-axis, and corrects the current command value of the q-axis or the angle detection value based on the estimation value of the angle error correlation value.

3. The motor controller according to claim 2, wherein the angle error corrector estimates a cosine value of the angle detection error as the angle error correlation value.

4. The motor controller according to claim 3, wherein the angle error corrector calculates a ratio by dividing a value obtained by multiplying −1 to a differential value of the current command value of the q-axis, by the current command value of the q-axis, and calculates, as an estimation value of the cosine value of the angle detection error, a value obtained by integrating a value obtained by multiplying a feedback value of the estimation value of the cosine value of the angle detection error to the ratio, wherein the estimation value of the cosine value of the angle detection error is the estimation value of the angle error correlation value.

5. The motor controller according to claim 3, wherein the angle error corrector calculates a ratio by dividing the current command value of the q-axis of last time calculation cycle by the current command value of the q-axis of this time calculation cycle, and calculates a value obtained by multiplying an estimation value of the cosine value of the angle detection error of the last time calculation cycle to the ratio, as the estimation value of the cosine value of the angle detection error of this time calculation cycle.

6. The motor controller according to claim 3, wherein the angle error corrector corrects the current command value of the q-axis by multiplying a reciprocal of an estimation value of the cosine value of the angle detection error to the current command value of the q-axis.

7. The motor controller according to claim 1, wherein the angle error corrector calculates the estimation value of the angle error correlation value based on a ratio between the current command value and a differential value of the current command value.

8. The motor controller according to claim 1, wherein the angle error corrector calculates the estimation value of the angle error correlation value based on a ratio between the current command value of last time calculation cycle and the current command value of this time calculation cycle.

9. The motor controller according to claim 1, wherein the angle error corrector corrects the current command value or the angle detection value based on a value obtained by multiplying an adjustment gain to the angle error correlation value.

10. The motor controller according to claim 9, wherein the angle error corrector changes the adjustment gain so that a correction amount of the current command value or the angle detection value decreases, as a rotational speed of the rotor increases.

11. The motor controller according to claim 1, wherein the angle error corrector calculates an estimation value of the angle detection error based on the estimation value of the angle error correlation value, and corrects the angle detection value by adding or subtracting the estimation value of the angle detection error to the angle detection value.

12. The motor controller according to claim 1, wherein the angle error corrector resets the estimation value of the angle error correlation value to a preliminarily set initial value at a first timing when the angle detection value changed stepwise or at a second timing on a basis of the first timing when the angle detection value changed stepwise.

13. The motor controller according to claim 1, wherein the rotation state detector detects an output torque of the motor as the rotation state, and wherein the current command calculator changes the current command value so that a detection value of the output torque approaches a target torque.

14. The motor controller according to claim 1, wherein the rotation state detector detects a rotational speed of the motor as the rotation state, and wherein the current command calculator changes the current command value so that a detection value of the rotational speed approaches a target rotational speed.

15. The motor controller according to claim 1, further comprising an angle detector of main system that detects the angle of the rotor of the motor, wherein when the angle detector of main system is normal, the current detector controls the current based on an angle detection value of main system detected by the angle detector of main system, the current detection value, and the current command value, and when the angle detector of main system is abnormal, the current detector controls the current based on the angle detection value detected by the angle detector, the current detection value, and the current command value, and wherein when the angle detector of main system is abnormal, the angle error corrector estimates the angle error correlation value, and corrects the current command value or the angle detection value based on the estimation value of the angle error correlation value.

16. An electric power steering apparatus comprising:
the motor controller according to claim 1,
the motor, and
a driving force transmission mechanism that transmits an output torque of the motor to a vehicle steering device.

* * * * *